United States Patent [19]

Boyle et al.

[11] Patent Number: 5,582,385
[45] Date of Patent: Dec. 10, 1996

[54] METHOD FOR CONTROLLING MOTION USING AN ADJUSTABLE DAMPER

[75] Inventors: Frederick P. Boyle, Kirtland; Nicholas K. Petek, Cleveland Heights; Dale P. Smith, Cleveland, all of Ohio

[73] Assignee: The Lubrizol Corporation, Wickliffe, Ohio

[21] Appl. No.: 429,990

[22] Filed: Apr. 27, 1995

[51] Int. Cl.⁶ .................................................. F16M 13/00
[52] U.S. Cl. ........................... 248/550; 248/562; 188/267
[58] Field of Search ..................................... 248/550, 562, 248/638, 636, 634, 619; 267/140.14, 136; 188/267

[56] References Cited

U.S. PATENT DOCUMENTS

| | | | |
|---|---|---|---|
| 3,807,678 | 4/1974 | Karnopp et al. | |
| 4,468,050 | 8/1984 | Woods et al. | |
| 4,762,306 | 8/1988 | Watanabe et al. | 248/550 X |
| 4,793,599 | 12/1988 | Ishioka | 248/636 X |
| 4,802,648 | 2/1989 | Decken et al. | 248/550 X |
| 4,825,370 | 4/1989 | Kurowsawa et al. | |
| 4,828,234 | 5/1989 | Hoying et al. | 248/550 X |
| 4,869,474 | 9/1989 | Best et al. | 248/636 X |
| 4,923,038 | 5/1990 | Lizell | |
| 4,992,190 | 2/1991 | Shtarkman | |
| 5,133,527 | 7/1992 | Chen et al. | 248/550 |
| 5,162,996 | 11/1992 | Matsumoto et al. | |
| 5,238,232 | 8/1993 | Kobayashi et al. | 248/550 X |
| 5,259,487 | 11/1993 | Petek | |
| 5,276,622 | 1/1994 | Miller et al. | |
| 5,276,623 | 1/1994 | Wolfe | |
| 5,398,785 | 3/1995 | Leitmann et al. | 188/267 |
| 5,427,347 | 6/1995 | Swanson et al. | 248/550 |

OTHER PUBLICATIONS

"Vibration Control Using Semiactive Force Generator," ASME Paper No. 73–DET–123, May, 1974; Karnopp, et al.
"A Solenoid–Actuated Pilot Valve in a Semi–Active Damping System," SAE Paper No. 881139, Aug., 1988; Guy, et al.
"A New Concept in Semi–Active Vibration Isolation," ASME, 109, 242, Jun., 1987; J. Ananoly et al.
"Road Vehicle Suspension System Design–A Review," Vehicle System Dynamics 16, pp. 167–192, 1987.
"Performance and Design Considerations for Dissipative Semi–active Suspension Systems for Automobiles," Proc. Instn. Mech. Engrs., 201, D2, pp. 149–153, 1987.
"Alternative Control Laws for Automotive Suspensions," Trnas. ASME, 111, p. 286, Jun., 1989.
Dynamic Leveling For Ground Vehicles, Doctoral Thesis, Royal Institute of Technology, Stockholm, Ch. 3, 1990; M. Lizell.
"Semi–Active Suspension Technology: An Evolutionary view," Adv. Autom. Techn. ASME, vol. 40, p. 327, 1991; Ivers et al.
The effect of hardward limitations on an on/off semi–active suspension, C442/88 IMechE 1988, pp. 199–206.
The Design and Development of a Semi–active Suspension for Military Tank, Lane R. Miller and Charles M. Nobles, 0148–7191/88/0711–1133$02.50, Copyright 1988 Society of Automotive Engineerins, Inc., pp. 1–9.
Demonstration of an Automotive Semi–Active Suspension Using Electroheological Fluid, Petak, et al, International Congress and Exposition, Detroit, Michigan Feb. 27–Mar. 2, 1995, SAE Technical Paper Series 950586.
SAE Technical Paper Series 881139–"A Solenoid–Actuated Pilot Valve in a Ssemi–Active Damping System", Yoram Guy, Michael W. Kerastas, and Robert E. Bruckman, Future Transportation Technology Conference and exposition, San Francisco, California, Aug. 8–11, 1988, pp. 1–12.

*Primary Examiner*—Terry Lee Melius
*Assistant Examiner*—Robert Pezzuto
*Attorney, Agent, or Firm*—David M. Shold; Frederick D. Hunter

[57] ABSTRACT

The relative motion and force between two interconnected elements can be controlled by a semi-active damper to minimize the instances of the motion exceeding acceptable limits, while maximizing isolation between the elements. Applying an algorithm to the control parameters of the damper provides excellent isolation from input vibration and shocks. The dampers and control algorithms are useful in primary vehicle suspension systems, cab mounts, seat mounts, and engine mounts.

66 Claims, 13 Drawing Sheets

METHOD FOR CONTROLLING MOTION USING AN ADJUSTABLE DAMPER

BACKGROUND OF THE INVENTION

The present invention relates to a method for controlling the relative motion and force between two interconnected elements to minimize the instances of the motion exceeding acceptable limits, while maximizing isolation between the elements. More specifically it relates to a method for reducing excessive motion while achieving good isolation in a shock absorber or damper suspended system.

Vibration isolation mounts, such as primary vehicle suspensions, engine mounts, truck cab suspensions and truck and bus seat suspensions, isolate a "sprung mass" from the object on which the mass is mounted (the "unsprung" mass). For best isolation, the relative motion allowed by a mount should be large compared to the amplitude of the input vibrations to the unsprung mass. In most applications, however, the relative motion between sprung and unsprung mass must be limited to significantly less than the maximum possible input vibration amplitude. In primary vehicle suspensions the maximum allowable motion is determined by design constraints such as vehicle styling. In engine mounts and truck cab suspensions the maximum allowable motion is determined by the alignment of the engine or cab with other elements of the vehicle. In truck and bus seat suspensions the maximum allowable motion is determined by the ergonomics of the operator or passenger comfortably being able to reach elements of the unsprung mass while being isolated from that mass.

There are three general mount types: passive, semi-active and active. Passive mounts (engineered rubber mounts, springs with friction dampers, or, most commonly, springs with viscous dampers) are limited in performance due to compromises needed to achieve good control at the resonance frequency and good isolation at high frequencies. Active systems use sensors and control hardware and software to determine what forces are necessary to "cancel" the vibrations from the unsprung mass. These systems require a power source to provide the force needed for optimum control and isolation. Cost and performance limitations prevent active systems from being widely accepted. The semi-active systems also use sensors and control hardware and software to determine what actions are needed to achieve the desired control and isolation of the sprung mass. However, unlike the active systems, the semi-active suspensions do not use a power source for providing the control force. They use a controlled damper that can remove energy from the suspension system but cannot add energy to the system. Control algorithms are developed that allow a continuously-variable semi-active suspension to perform at a level of isolation that is comparable to the fully active system at a significantly reduced initial- and operating-cost and in a smaller and lighter package.

Several semi-active control algorithms have been proposed that use a controllable damper to achieve good isolation between sprung and unsprung masses. One such control algorithm uses the damper to counteract the force of the spring to limit the input force to the sprung mass. Another such control algorithm uses the damper to perform as if the damping is not between the sprung mass and the unsprung mass but is instead between the sprung mass and an inertial reference frame, the "sky". The "sky hook" model described by Karnopp, et al., "Vibration Control Using Semi-active Force Generator," ASME Paper No. 73-DET-123, May, 1974, is one of the best known models for a control algorithm. This reference discloses a damper which exerts a force tending to reduce the absolute velocity of the mass, while the conventional damper exerts a force tending to reduce relative velocity.

Guy, et al., "A Solenoid-Actuated Pilot Valve in a Semi-Active Damping System," SAE Paper No. 881139, August 1988, teaches that a shortcoming of the most effective isolation semi-active control algorithms, especially the "sky hook", is that large velocity and displacement inputs into the suspension can consume all available suspension travel, resulting in suspension "Topping" or "Bottoming."

This shortcoming must be overcome by using a) alternate algorithms that are less effective in isolating the sprung mass or b) control strategies that use the best vibration isolation algorithm when the probability of topping or bottoming is low, and use a separate algorithm, which acts to prevent the suspended mass from exceeding the stroke limits, when the probability of topping and bottoming is high.

U.S. Pat. No. 4,468,050, Woods et al., Aug. 28, 1984, discloses a computer optimized adaptive suspension system. This reference describes the problems of "Topping Out" and "Bottoming Out," i.e., the condition where a bump or other influence on the chassis or wheel causes the axle to try to rise toward the chassis closer than it can physically. This can cause a severe jolt to the passengers and possibly damage the shock absorber or suspension. To avoid this, the control process independently increases compression damping as the axle approaches bottoming out and increases rebound damping as the axle approaches topping out.

U.S. Pat. No. 5,276,622, Miller et al., Jan. 4, 1994, discloses a system for reducing suspension end-stop collisions, which provides an override control policy which alters the damper command signals as necessary to increase the damping characteristics of the damper assembly at times when the isolation system is likely to meet or exceed the end stops in order to minimize the incidence of end-stop collisions.

SUMMARY OF THE INVENTION

The present invention provides a method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being provided with a means for applying a second, controlled, force therebetween; said method comprising:

(a) measuring the displacement $x_{rel}$ of the second element relative to the first element, $x_{rel}$ being defined as zero at the equilibrium position;

(b) determining the relative velocity $v_{rel}$ between said first and second elements;

(c) calculating a force $F_{applied}$ defined as:

$$F_{applied} = F_{calc} - F_{sys}$$

where $F_{calc}$ is a force, calculated from knowledge of the position and motion of the elements, sufficient to prevent the relative motion of the elements from exceeding predetermined limits, and $F_{sys}$ is a nonzero sum of the forces acting between the first and second elements other than the controlled force applied by the second force means, provided that $F_{applied}=0$ if said force $F_{applied}$ is in the same direction as the relative velocity $v_{rel}$ of the elements, or if $|v_{rel}| \leq v_{db}$, where $v_{db}$ is a velocity deadband with a preselected value greater than or equal to zero, and $F_{applied}=F_{max}$ if said force $F_{applied}$ is in direction opposite the relative velocity $v_{rel}$ of the elements, and greater than the maximum force $F_{max}$ that can be applied by the second force means in the direction of $F_{applied}$; and (d) applying said force $F_{applied}$ between the first and second elements;

whereby the force transmitted from the first element to the second element and the relative displacement between said elements are controlled.

More particularly, the present invention provides a method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second, controlled, force therebetween; said method comprising:

(a) measuring the displacement $x_{rel}$ of the second element relative to the first element, $x_{rel}$ being defined as zero at the equilibrium position;

(b) calculating the (i) relative velocity $v_{rel}$ and (ii) relative acceleration $a_{rel}$ of the elements;

(c) calculating an applied force $F_{applied}$, defined as $$F_{applied} = \frac{ma_{rel}}{1 - \sqrt{1 + \frac{2a_{rel}d}{v_{rel}^2}}} - F_{sys} \quad \text{if } v_{rel} > 0 \quad \text{(condition 1)}$$

and $v_{rel}^2 > -2a_{rel}d$, $$F_{applied} = \frac{ma_{rel}}{1 + \sqrt{1 + \frac{2a_{rel}d}{v_{rel}^2}}} - F_{sys} \quad \text{if } v_{rel} < 0 \quad \text{(condition 2)}$$

and $v_{rel}^2 > -2a_{rel}d$, $F_{applied} = 0$ if $|v_{rel}| \leq v_{db}$, or conditions 1 and 2 are not met;

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means, and (d) applying said force $F_{applied}$ between the first and second elements; provided that (i) if the direction of said force $F_{applied}$ is in the same direction as the relative velocity $v_{rel}$, then said force $F_{applied}=0$, (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;

whereby the force transmitted and the relative displacement between said elements are controlled.

In another embodiment the present invention provides a method for controlling the relative motion between two elements, as before described, comprising:

(a) measuring the displacement $x_{rel}$ of the second element relative to the first element, $x_{rel}$ being defined as zero at the equilibrium position;

(b) calculating the relative velocity $v_{rel}$ of the two elements;

(c) calculating an applied force $F_{applied}$, defined as $$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{if condition 1 is not met;}$$

and (d) applying said force $F_{applied}$ between the first and second elements; where the terms are defined as above and with the aforementioned provisos.

In another embodiment the present invention provides a method for controlling the relative motion between two elements, as before described, comprising:

(a) measuring the displacement $x_{rel}$ of the second element relative to the first element, $x_{rel}$ being defined as zero at the equilibrium position;

(b) calculating the relative velocity $v_{rel}$ of the two elements;

(c) calculating an applied force $F_{applied}$, defined as $$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{if } v_{rel}F_{sys} < 0, \quad \text{(condition 2)}$$

and condition 1 is not met;

$$F_{applied} = -2\zeta v_{rel}\sqrt{km} - F_{sys} \quad \text{if conditions 1 and 2 are not met;}$$

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, k is the spring rate of the spring assembly at the relative displacement $x_{rel}$ $F_{sys}$ is the sum of the forces acting between the first and second elements other than the controlled force applied by the second force means, $\zeta$ is a number greater than or equal to 0 and less than or equal to 1; and (d) applying said force $F_{applied}$ between the first and second elements; provided that (i) if the direction of said force $F_{applied}$ is in the same direction as the relative velocity $v_{rel}$, then said force $F_{applied}=0$, (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;

whereby the force transmitted from the first element to the second element and the relative displacement between said elements are controlled.

In another embodiment the present invention provides a method for controlling the relative motion between two elements, as before described, comprising:

(a) measuring (i) the displacement $x_{rel}$ of the second element relative to the first element, $x_{rel}$ being defined as zero at the equilibrium position, and (ii) the absolute acceleration of the second element;

(b) calculating (i) the relative velocity $v_{rel}$ of the elements and (ii) the absolute velocity $v_{abs}$ of the second element;

(c) calculating a force $F_{applied}$ defined as:

$$F_{applied} = 0 \quad \text{if } |v_{rel}| \leq v_{db};$$

$$F_{applied} = -\frac{mv_{rel}^2}{2d} - F_{sys} \quad \text{if } v_{rel}^2 > -4d\zeta v_{abs}\sqrt{k/m}$$

$$\text{or} \left[ v_{rel} > 0 \text{ and } v_{abs} < \frac{-F_{sys}}{2\zeta\sqrt{km}} \right], \text{ or}$$

$$\text{or} \left[ v_{rel} < 0 \text{ and } v_{abs} > \frac{-F_{sys}}{2\zeta\sqrt{km}} \right] \right\},$$

and condition 1 is not met $$F_{applied} = -2\zeta v_{abs}\sqrt{km} - F_{sys} \quad \text{if conditions 1 and 2 are not met;}$$

and (d) applying said force $F_{applied}$ between the first and second elements; where $\zeta$ is a number greater than 0.5 and less than 3, k is the spring rate of the spring assembly at the relative displacement $x_{rel}$, and the remaining terms are defined as above and with the aforementioned provisos.

In another embodiment the present invention provides a method for controlling the relative motion between two elements, as before described, comprising:

(a) measuring (i) the displacement $x_{rel}$ of the second element relative to the first element, $x_{rel}$ being defined as zero at the equilibrium position, and (ii) the absolute acceleration of the second element;

(b) calculating (i) the relative velocity $v_{rel}$ of the elements, (ii) the relative acceleration $a_{rel}$ of the elements, and (iii) the absolute velocity $v_{abs}$ of the second element;

(c) calculating a force $F_{applied}$ defined as:

$$F_{applied} = 0 \quad \text{if } |v_{rel}| \leq v_{db}; \quad \text{(condition 1)}$$

$$F_{applied} = \frac{ma_{rel}}{1 - \sqrt{1 + \frac{2a_{rel}d}{v_{rel}^2}}} - F_{sys} \quad \text{if } v_{rel} > 0 \quad \text{(condition 2)}$$

$$\text{and } v_{rel}^2 > -2a_{rel}d$$

$$\text{and } \left[ v_{abs} < \frac{-F_{sys}}{2\zeta\sqrt{km}} \text{ or} \right.$$

$$\left. v_{rel}^2 > \frac{8dk\zeta^2 v_{abs}^2}{ma_{rel} + 4\zeta v_{abs}\sqrt{km}} \right]$$

and condition 1 is not met;

-continued $$F_{applied} = \frac{ma_{rel}}{1+\sqrt{1+\frac{2a_{rel}d}{v_{rel}^2}}} - F_{sys} \quad \text{if } v_{rel} < 0 \quad \text{(condition 3)}$$

and $v_{rel}^2 > -2a_{rel}d$ and $\left[ v_{abs} > \frac{-F_{sys}}{2\zeta\sqrt{km}} \text{ or} \right.$ $\left. v_{rel}^2 > \frac{8dk\zeta^2 v_{abs}^2}{ma_{rel} + 4\zeta v_{abs}\sqrt{km}} \right]$ and conditions 1 and 2 are not met;

$F_{applied} = -2\zeta v_{abs}\sqrt{km} - F_{sys}$   if conditions 1, 2 and 3 are not met;

and (d) applying said force $F_{applied}$ between the first and second elements; where the terms are defined as above and with the aforementioned provisos.

Moreover, the present invention provides a device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) an adjustable damper capable of applying a variable force $F_{applied}$ between said first and second elements; and (B) a controller adapted to send a control signal to said damper in response to the condition of the two movably interconnected elements, said control signal corresponding to a value of $F_{applied}$;

wherein said control signal is determined by any of the above described methods.

DETAILED DESCRIPTION OF THE INVENTION

Figure 1:
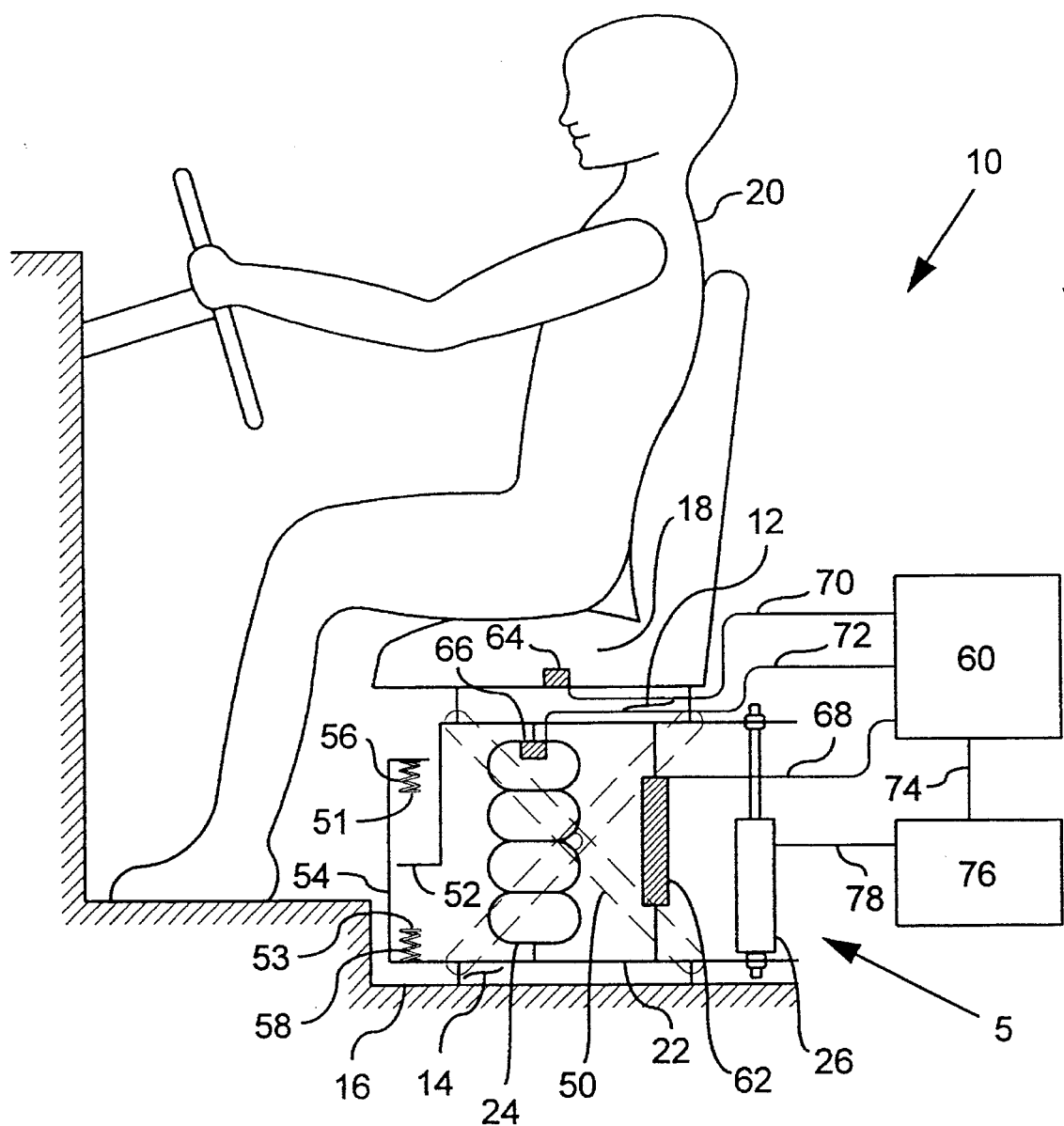
FIG. 1 is a representation of a device including a damping mechanism for a suspended mass.

FIG. 1 illustrates one embodiment of the present invention. Here reference number 10 designates a two-degree-of-freedom suspension system or similar force-isolating mounting system for controlling the relative motion between two elements. The system uses a suspension mechanism 5 to interconnect vertically-spaced and relatively movable supported (or "sprung") and supporting (or "unsprung") elements 12 and 14. By way of example, the elements 12 and 14 respectively are shown to be the sprung and unsprung mass elements of a suspended seat. Alternatively, the system could represent a mounting and suspension system for a vehicle cab, an engine mount, the primary suspension system for a vehicle chassis, or any other system for which vibration isolation is required.

As illustrated, the sprung mass is a suspended seat carrying a human operator 20, mounted on a vehicle cab, 16, which is not shown in detail. A suspended seat of this type is typically used to isolate and protect an operator of a heavy on- or off-road vehicle. In particular, the sprung element 12 has mass "m" which, in the example illustrated, includes a contoured and cushioned seat 18, the portion of the mass of the operator 20 which is supported by the seat, and a portion of the mass of the suspension mechanism 5. The unsprung element 14 includes the base 22 used to attach the seat to the cab 16 and a portion of the mass of the suspension mechanism 5. In general, the cab 16 will be supported and isolated from a road or other surface by additional suspension components, not shown. However, such suspension elements are normally not sufficient to fully isolated the cab 16 from road surface irregularities or other vibration inputs. Hence, a primary function of the system 10 is to isolate the supported member 12 insofar as possible from vibratory or other forces transmitted through member 14.

The suspension mechanism 5 for the seat of FIG. 1 includes a mechanical linkage 50, an adjustable primary spring assembly 24, and a semi-active damper assembly 26. The mechanical linkage 50 confines the relative motion of the sprung and unsprung elements 12, 14 to the vertical axis, thus allowing only an up and down motion between the elements. It is to be understood that application of the present invention is not limited to vertical motion alone, and indeed variations of the system can be constructed which control motion in all three physical dimensions. However, for the sake of clarity, a device which controls motion along one axis only will be described in detail. Extension to additional dimensions can be accomplished by the person skilled in the art.

The mechanical linkage aligns the spring and damper 24 and 26 to apply force along the axis of motion. Incorporated within the mechanical linkage 50 are stops which limit the travel of the suspension mechanism 5 along the axis of movement. These stops are shown schematically as two interlocking members 52 and 54. The reference number 51 represents the extension ("rebound") stop of the mechanism 5 which is reached when elements 12 and 14 reach full extension. The reference number 53 represents the retraction ("jounce") stop of the suspension mechanism 5 which is reached when the members 12 and 14 are in a fully retracted or compressed position. Impact dampers 56 and 58, such as resilient, deformable elastomeric pads or the like are typically used as stops to cushion the impact when elements 12 and 14 reach the limits of the extension or retraction travel.

The primary spring assembly 24 of the suspension mechanism 5 can be any known type of spring assembly. In a preferred embodiment, as illustrated, it is an adjustable spring assembly, preferably an air-adjustable assembly, which allows the operator 20 to sit at an appropriate height for comfort, safety and operating efficiency. The characteristics of the primary spring assembly 24 are typically designed such that the natural frequency of the suspension system 10 is on the order of 1 Hz over the typical load range of the seat. The spring assembly 24, however, does not have to be linear in its response, nor does the natural frequency of the suspension system 10 need to be particularly well defined.

Figure 2:
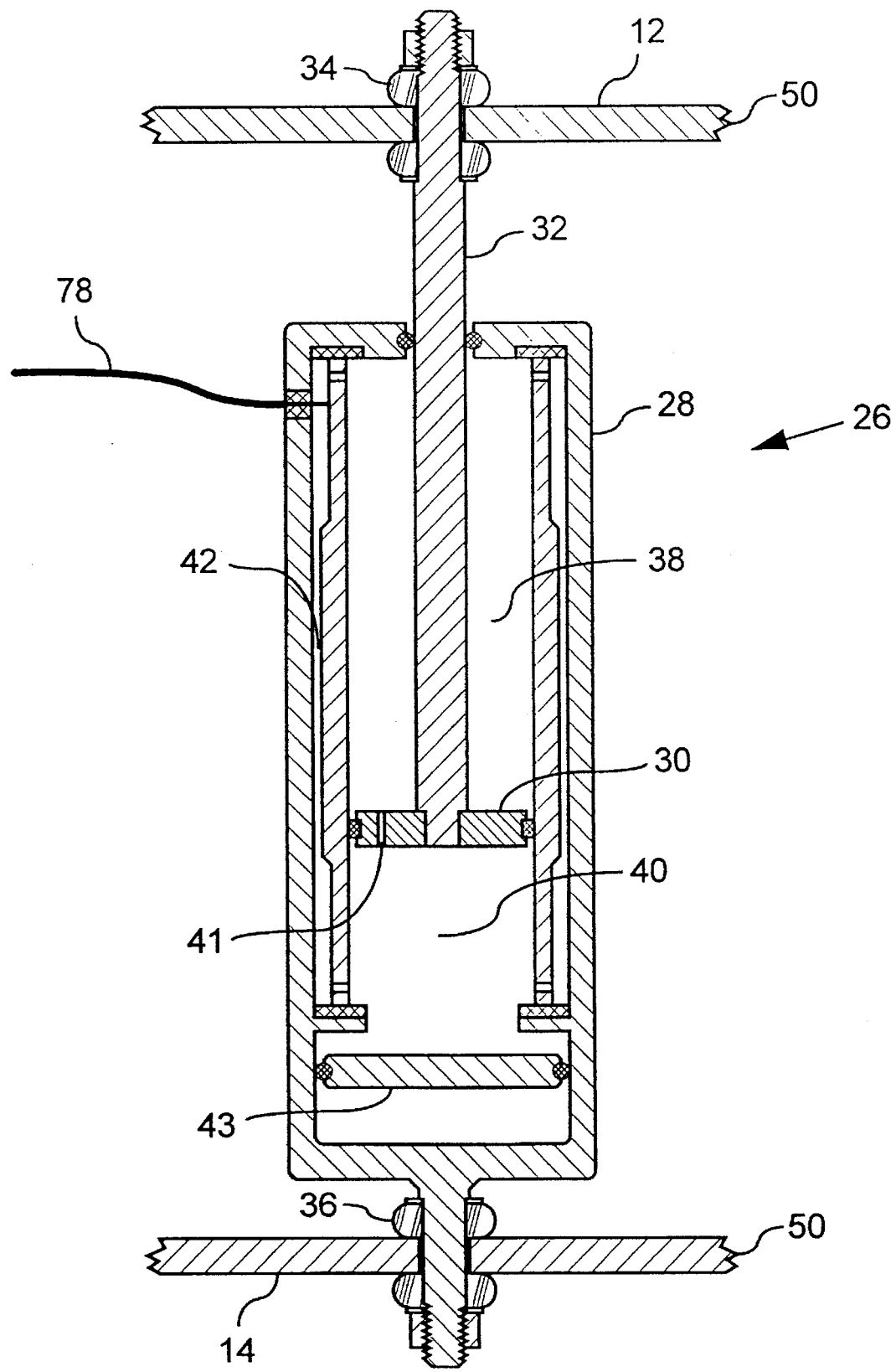
FIG. 2 shows in detail one embodiment of a semi-active damper assembly.

The semi-active damper assembly 26 of the suspension mechanism 5 can be of any suitable construction. Typically it is of the hydraulic piston and cylinder type, as illustrated in FIG. 2, having a hydraulic cylinder 28 enclosing a piston 30. A piston rod 32 is connected to the piston 30 and is secured to the upper portion of the mechanical linkage 50 by a suitable connector including, for example, a bushing 34 formed by elastomer or similar resilient, compliant material. The cylinder 28 is secured to the lower portion of the mechanical linkage 50 by a suitable connector which includes, for example, a deformable bushing 36, also formed of elastomer or similar resilient, compliant material. Relative vertical motion between elements 12 and 14 causes relative movement between the cylinder 28 and the piston 30. The ratio between the relative motion between elements 12 and 14 and the relative movement between the cylinder 28 and the piston need not be 1-to-1, and the positioning of the damper assembly 26 need not be vertical as shown in FIG. 1. The relative movement between cylinder 28 and piston 30 displaces a fluid (not shown) between the upper and lower variable volume fluid chambers 38 and 40 of the cylinder 28 via a flow paths 41 and 42. The flow path 42 can be rapidly adjusted by electrical, mechanical, or other means, to alter the force required to cause movement in either an extending or retracting direction between the cylinder 28 and the piston 30. The flow path 41 is parallel to flow path 42, and is a fixed viscous damping passage. Flow path 41 can be used to tune the damping characteristics of the damper when the relative velocity between the cylinder 28 and the piston 30 is low, or when flow path 42 is severely restricted. A means, such as floating piston 43, can be provided to allow for expansion and displacement of the fluid.

The damper assembly 26 is preferably of the continuous force-controlled type such as that disclosed in Petek et al., "Demonstration of an Automotive Semi-active Suspension Using Electrorheological Fluid", SAE Paper No. 950586, February 1995, and as further disclosed in U.S. Pat. No. 5,259,487, to which attention is directed for further details.

The force required to cause relative displacement of the cylinder 28 within the piston 30 is rapidly variable in a controlled manner from an "off" damping state of low damping force to higher damping states of higher damping force. The damper, in order to be continuously variable, should have a continuum of higher damping states, which can be either truly continuous, as would be the case for an electrorheological damper, or else substantially continuous, as might be achieved by the presence of a large number of discreet higher damping states. In the damper illustrated, the damping force in the "off" state is not zero due to the viscous character of the fluid within the damper. In the illustrated embodiment, the damping force is continuously variable up to a "maximum" damping force which is determined by the design constraints of the fluid and damper assembly. The increase in damping force in excess of the "off" damping force is, as in the illustrated device, generated essentially independently of the relative velocity of the damper elements. Changes of the damping force in the preferred damper which employs an electrorheological fluid result from electric fields that are applied across the flow path 42, restricting fluid flow through the path as a function of the applied electric field.

If, as preferred, the damper is an electrorheological damper, it will contain an electrorheologically active fluid. Electrorheological ("ER") fluids are fluids which can rapidly and reversibly vary their apparent viscosity in the presence of an applied electric field. They are generally dispersions of finely divided solids in hydrophobic, electrically non-conducting oils. They have the ability to change their flow characteristics, even to the point of becoming solid, when subjected to a sufficiently strong electric field. When the field is removed, the fluids revert to their normal liquid state. For further information on suitable electrorheological fluids, attention is directed to publications WO 93/07244, WO93/07243 and U.S. application Ser. No. 08/227,814 now U.S. Pat. No. 5,429,761, Ser. No. 08/227,770 now U.S. Pat. No. 5,445,760 and Ser. No. 08/293,536, now U.S. Pat. No. 5,501,809.

While damper assembly 26 is preferably an ER damper, it can be any continuously variable force controlled type damper. In such a device the damping force, greater than the "off" damping force, can be rapidly controlled essentially independently of the velocity across the damper, whether by mechanical, electrorheological, magnetorheological, or other means. Furthermore, the damper assembly 26 need not be of the hydraulic piston and cylinder type. For example, the damper assembly 26 can be of the rotary type described in U.S. Pat. No. 4,992,190, Shtarkman (see "Example" in col. 60), where force in excess of an "off" damping state for relative rotary motion of two damper components can be rapidly varied in a controlled manner essentially independent of the rotary velocity of the two components.

A controller 60, discussed in detail below, produces a control signal for controlling the flow path 42 of the damper assembly 26 in order to rapidly select the force applied "$F_{applied}$" between elements 12 and 14 by the damper. It is understood that the actual force created at the damper to effect an applied force $F_{applied}$ between elements 12 and 14 may be different from $F_{applied}$ due to the lever ratios designed for the seat mechanism 5 and the positioning of damper assembly 26 within the mechanism. The applied force $F_{applied}$, however, refers to the controlled force due to the damper assembly 26 that is actually applied between elements 12 and 14. The force $F_{applied}$ is selected by the control policies of the present invention based on the instantaneous motion of the supported element 12 relative to the unsupported element 14, or in conjunction with the absolute motion of the supported element 12.

Various parameters are employed for calculating the applied force $F_{applied}$. The terms "$v_{abs}$" and "$a_{abs}$", respectively, designate the absolute vertical velocity and the absolute vertical acceleration of the supported element 12. By convention, a positive value of these state variables indicates an upward direction and a negative value a downward direction. The designations "$x_{rel}$", "$v_{rel}$", and "$a_{rel}$" respectively designate the relative vertical displacement, the relative vertical velocity and the relative vertical acceleration between the supported element 12 and the unsupported element 14. Consistent with the usage above, a positive value of these variables indicates an upward direction of the supported element 12, away from the unsupported element 14, and a negative value a downward direction.

The time-averaged equilibrium position of the suspension mechanism 5 is defined to be zero. Due to friction in the suspension mechanism 5, the time-average equilibrium position may not be the same as the static or rest position, since friction can prevent the mechanism from returning to the true, time-average equilibrium position. In particular, a rest position can depend on whether the return to equilibrium is from the positive direction or the negative direction, on the velocity of the system as it approaches equilibrium, and other variables. Therefore, the time-averaged equilibrium provides the best estimate of the true equilibrium. The distance from this equilibrium position to the extension stop 51 is defined as $x_{rel}=x_{+limit}$, and the distance from the equilibrium position to the retraction stop 53 is defined as $x_{rel}=x_{-limit}$. In suspension system 10 the height of suspension mechanism 5 is optionally adjustable to allow for operator comfort, safety and operating efficiency, the equilibrium position being selected by the operator. In suspension systems without an adjustable height control, the equilibrium position is affected by the mass of the operator. Thus, while the actual equilibrium position is not the same for all operators, the equilibrium position for each operator will always be defined as $x_{rel}$ equal zero, and $x_{+limit}$ and $x_{-limit}$ will vary accordingly. Similarly, the operator may desire to adjust the stroke limit of the suspension mechanism 5 to limit the distance from the operator's arms and legs to the vehicle operating controls. Hence, while $x_{rel}$ can normally vary from the extension stop 51 to the rebound stop 53, the operator might wish to limit the stroke to a lesser range. Therefore in one embodiment, a feature is included in the suspension system 10 to allow the operator to independently set the displacement limits $x_{+limit}$ and $x_{-limit}$ relative to the equilibrium position of $x_{rel}$, as long as those limits are within the maximum displacements allowed by the stops 51 and 53. In the present illustration, however, the displacement limits are determined by the mechanical stops 51 and 53. In a more general sense, $x_{+limit}$ and $x_{-limit}$ represent acceptable displacement limits, regardless of their origin or nature.

A controller 60 receives input data from motion sensors 62 and 64 associated with the elements 12 and 14, and, in this illustration, from a pressure sensor 66 associated with an air spring assembly 24. Sensor 62 directly detects the instantaneous relative displacement $x_{rel}$ of elements 12 and 14. Sensor 64 detects the instantaneous absolute acceleration $a_{abs}$ of element 12. Sensor 66 detects the time averaged pressure in the air spring of the spring assembly 24, which is a function of the mass m of the sprung element 12. Data from sensors 62, 64 and 66 are sent via lines 68, 70 and 72 to the controller 60. Those data are used by the controller 60 to calculate a signal which is sent via line 74 to a power source 76. The power source 76 then generates the appropriate control signal which is sent via line 78 to the semi-active damper assembly 26 to rapidly select the force to be applied $F_{applied}$ by the damper. It is noted that the signals referred to herein will typically be electrical signals, but they can be in principle any sort of signals capable of conveying information from one component of the system to another, including pneumatic, optical, magnetic, or mechanical signals. It is further noted that for some embodiments of semi-active damper assembly 26, the control signal sent via line 78 for an applied force of magnitude $|F_{applied}|$ in either the positive direction or the negative direction can be the same signal. However, this is not essential since the jounce and rebound force for the damper 28 can be different for the same restriction of controlled flow path 42 due to various design features such as the presence of piston rod 32 only on one side of piston 30. Similarly the maximum force $F_{max}$ that can be applied between elements 12 and 14 need not be the same in both jounce and rebound directions. Hence, it is understood, that the controller can compensate for the differences in the jounce and rebound directions, or the controller can approximate that the same signal produces the same $|F_{applied}|$ independent of direction.

Figure 3:
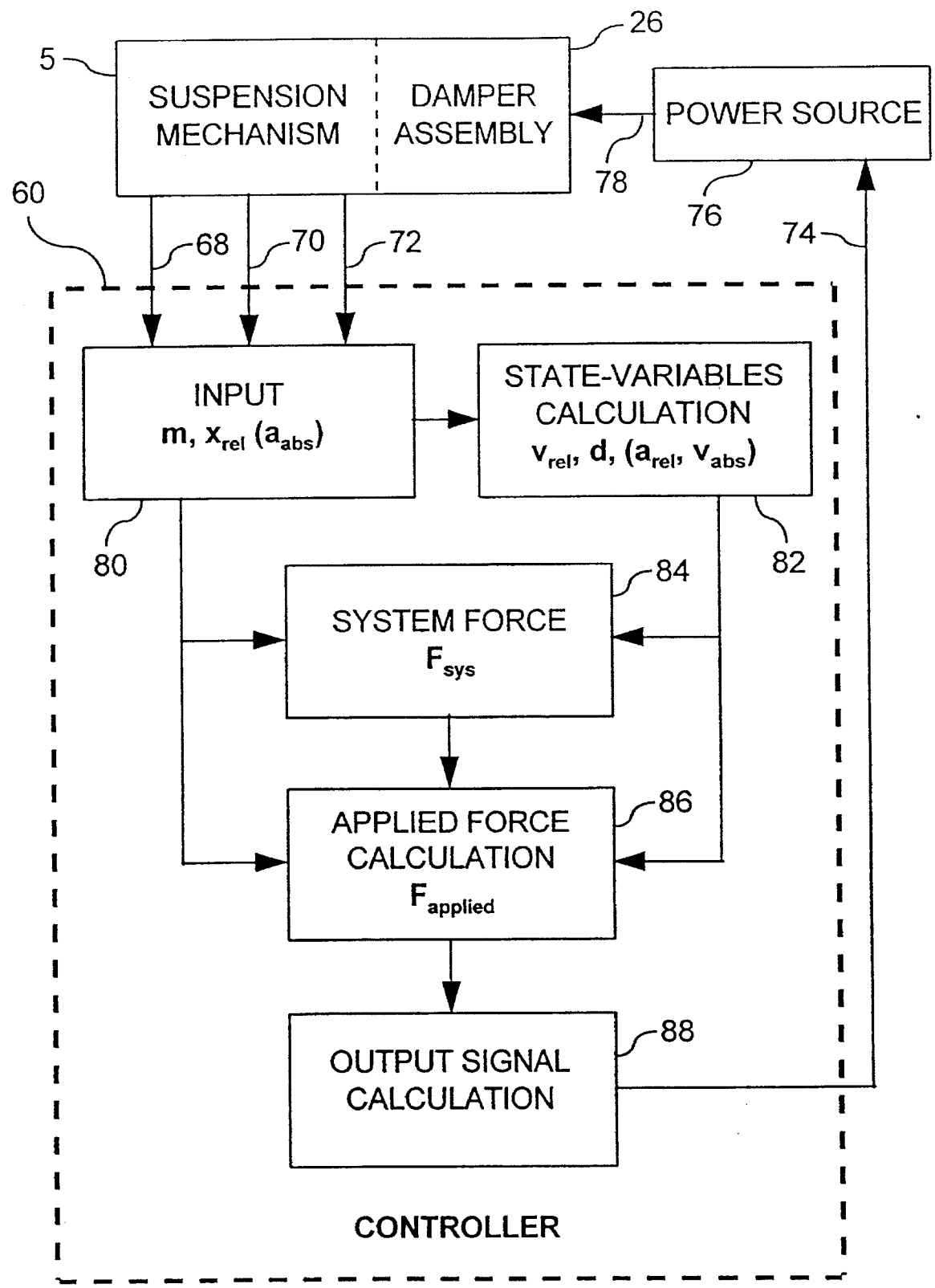
FIG. 3 shows a functional block diagram of the suspension system of FIG. 1 showing details of a controller of the present invention.

Referring now to FIG. 3, there is shown a functional block diagram of the suspension system with controller 60. The controller 60 has an input block 80, a state-variables calculation block 82, a system force "$F_{sys}$" calculation block 84, an applied force $F_{applied}$ calculation block 86, and an output signal calculation block 88. Each of these will now be described in greater detail.

The input block 80 receives the sensor data via lines 68, 70 and 72, and converts these signals to values for the following state variables: time average mass m of sprung element 12, the instantaneous relative displacement $x_{rel}$, and, if needed for subsequent calculations in the calculation block 86, the instantaneous absolute acceleration $a_{abs}$ of the sprung element 12.

The state-variables calculation block 82 differentiates the relative displacement $x_{rel}$ signals to obtain the instantaneous relative velocity $v_{rel}$ and calculates the distance "d" from the relative displacement $x_{rel}$ to the displacement limit $x_{+limit}$ or $x_{-limit}$ in the direction of the relative velocity $v_{rel}$. That is, if $v_{rel}$ is positive, then d equals $x_{+limit}$ minus $x_{rel}$, and if $v_{rel}$ is negative then d equals $x_{-limit}$ minus $x_{rel}$. The state-variables calculation block 82 also differentiates the relative velocity data $v_{rel}$ to obtain the instantaneous relative acceleration $a_{rel}$, and integrates the absolute acceleration $a_{abs}$ to obtain the absolute velocity $v_{abs}$ if these state variables are required for subsequent calculations in calculation block 86.

As is well known to those skilled in the art, the differentiation function can be performed using a second order bandpass filter with a corner frequency of at least about 10 times the highest frequency of interest. Similarly, as is well known to those skilled in the art, integration can be performed using a second order bandpass filter with a corner frequency of at most about 0.1 times the lowest frequency of interest. Using this method of integration eliminates concern about the constant term of the absolute velocity $v_{abs}$, since the 0 Hz velocity is set to zero. That is, it is a well known physical fact that the concept of absolute velocity is, strictly speaking, meaningless. However, the term "absolute velocity" is used herein, as it is throughout this field of art, as a term of art to indicate the results obtained by integration of the absolute acceleration of a body. The use of a second order bandpass filter with an appropriately selected corner frequency will provide a so-called, or estimated, absolute velocity which is in fact a velocity relative to the average uniform motion of the body in the recent past.

Either analog or digital filters can be used when performing the differentiation or integration functions. Digital filters are preferred due to their performance stability. For further information on digital filters, their use in differentiation and in integration to estimate absolute velocity, attention is directed to Miller et al., "The Design and Development of a Semi-active Suspension for a Military Tank," paper 881133, Society of Automotive Engineers, Inc., 1988, pages 1–9, particularly pages 6–7, and Miller, "The effect of hardware limitations on an on/off semi-active suspension," paper C442/88, I. Mech. E., 1988, pages 199–205, particularly 202–203.

When selecting a frequency range for optimally controlling the suspension system, one might be inclined to choose the range as wide as possible in an attempt to provide maximum performance. However, due to resolution and processing time constraints of present-technology digital processors, especially when using filters for performing the differentiation and integration function, and due to the response time constraints of other elements of the suspension system, the range should generally be selected conservatively. For a suspended seat application, the frequency range for optimal control is typically chosen to be from the resonant frequency of the suspension system, on the order of 1 Hz, up to a frequency of approximately 20 Hz. In general, for a suspended seat, even a "less-than-optimally controlled" suspension mechanism 5 and, in particular, the cushioned seat 18 can provide a measure of isolation for inputs of greater than 20 Hz, which may be adequate. Hence, in this application the lowest frequency of interest is generally 1 Hz; thus causing the corner frequency for integration to be at most 0.1 Hz. The highest frequency of interest is generally 20 Hz; thus causing the corner frequency for differentiating the relative displacement $x_{rel}$ data to obtain the instantaneous relative velocity $v_{rel}$ to be at least 200 Hz. For the algorithms that employ the relative acceleration in calculation block 86, the relative velocity $v_{rel}$ can be differentiated in a similar manner to obtain the instantaneous relative acceleration $a_{rel}$. Generally, a second differentiation can result in a signal with significant high frequency noise. Fortunately, independent of whether the relative acceleration $a_{rel}$ is calculated or measured directly, only those accelerations near the resonant frequency are of concern. In particular, since the relative acceleration $a_{rel}$ is highly frequency dependent, in the preferred imbodiment of the algorithms with the relative acceleration, a second-order low-pass filter with a corner frequency of at least two times the resonant frequency and at most 20 times the resonant frequency is used. Hence, for the case of a seat suspension with a resonant frequency of 1 Hz, relative acceleration $a_{rel}$ data is filtered using a second-order low-pass filter with a corner frequency of between 2 and 20 Hz.

The outputs of the input block 80 and the state variables calculation block 82 of the controller 60 are the state variables of the system. These variables are the time-averaged effective mass m of supported element 12, instantaneous relative displacement $x_{rel}$ and instantaneous relative velocity $v_{rel}$ of elements 12, 14, instantaneous distance d to the displacement limit in the direction of $v_{rel}$, and, if required in block 86, the instantaneous relative acceleration $a_{rel}$ of the elements 12 and 14 and the instantaneous absolute velocity $v_{abs}$ of element 12. It is to be understood that not all of the illustrated sensors need be employed or provided in association with the system 10 to produce or derive the needed state variables for every mode of calculation. It is also to be understood that these data can also be produced or derived from data from other sensors or other types of sensors or inputs than those shown in FIG. 1, can be derived using other integration of differentiation means than those described above, or can be filtered to limit high frequency noise or feedback using other methods than those described above.

The system force $F_{sys}$ calculation block 84 of controller 60 calculates all forces which are applied between elements 12 and 14 by the suspension mechanism 5 other than the controllable applied force $F_{applied}$ and that portion of the spring force which maintains the elements 12, 14 at the equilibrium position in response to the force of gravity. Included within the system force is the variation of the spring force of the primary spring assembly 24 when the spring assembly is deflected from the equilibrium position, the "off" damping force of the semi-active damper assembly 26, the frictional force generated by the mechanical linkage 50, and any additional forces due to elastomeric bushings within the suspension mechanism. The additional forces, for example, could include forces due to the jounce or rebound impact dampers 56 or 58 should the relative displacement $x_{rel}$ be sufficiently great to allow contact with either damper 56 or 58.

Let us now consider the likely or common values for the components of the system force $F_{sys}$. The variation in primary spring force between elements 12 and 14 from the equilibrium position is $-x_{rel}$ times the spring rate "k" of the spring assembly 24 at the position $x_{rel}$. Since the air spring illustrated is a relatively linear spring, k, in this case, can be approximated as a constant equal to the spring rate at the equilibrium position. Secondly, the "off" damping force between elements 12 and 14 of damper assembly 26 can be approximated by $-Cv_{rel}$ where "C" is an adjustable constant that can depend on the performance character of damper assembly 26 or can be tuned to optimize the calculated $F_{sys}$. Finally, the friction force of the suspension mechanism is typically a velocity-independent constant in the direction opposite the relative velocity $v_{rel}$ when the velocity is not equal to zero, and is another, usually larger, constant when the relative velocity $v_{rel}$ equals zero. That is, the friction force equals $-F_{dynamic}$ times the sign of the relative velocity $sgn(v_{rel})$ when $v_{rel}$ is not zero and equals $-F_{static}$ times the sign of any opposing force when $v_{rel}$ is zero (the magnitude of the static friction force $F_{static}$, however, can never be greater than the opposing force). Another way of considering the friction force is, as previously described, that the friction force can cause the rest position of the seat suspension system 10 to be other than the zero-friction equilibrium position of the seat suspension. In particular, the friction force permits there to be a range of possible rest positions of the seat. This range of rest positions can be thought of as a displacement deadband "$\pm x_{db}$" about the equilibrium position. An approximation of the friction force can be included with the approximated spring force such that the combined force is $-kx'$ where x' is the relative displacement of elements 12 and 14 in excess of a displacement deadband $x_{db}$ with value zero or greater. In this formulation, x' equals zero if the absolute value of the relative displacement $|x_{rel}|$ is less than or equal to the displacement deadband $x_{db}$, x' equals $x_{rel}$ minus $x_{db}$ if the absolute value of the relative displacement $|x_{rel}|$ is greater than the displacement deadband $x_{db}$ and $x_{rel}$ is positive, or x' equals $x_{rel}$ plus $x_{db}$ if the absolute value of the relative displacement $|x_{rel}|$ is greater than the displacement deadband $x_{db}$ and $x_{rel}$ is negative. The other internal forces of the suspension system 10 are in this case considered insignificant since the jounce and rebound impact dampers 56, 58 are generally not contacted within the selected displacement limits $x_{-limit}$, $x_{+limit}$. Therefore, for seat suspension 10 the uncontrolled system force $F_{sys}$ is approximated by $F_{sys}=-kx'-Cv_{rel}$ where k, x', and C are defined above. It is understood that other approximations of the system force $F_{sys}$ can be made. It is also understood that the approximation can be made that the system force $F_{sys}$ is equal to zero. It is further understood that sensors, other that those shown in FIG. 1, can be used to obtain values for the internal forces of the suspension system.

Figure 5:
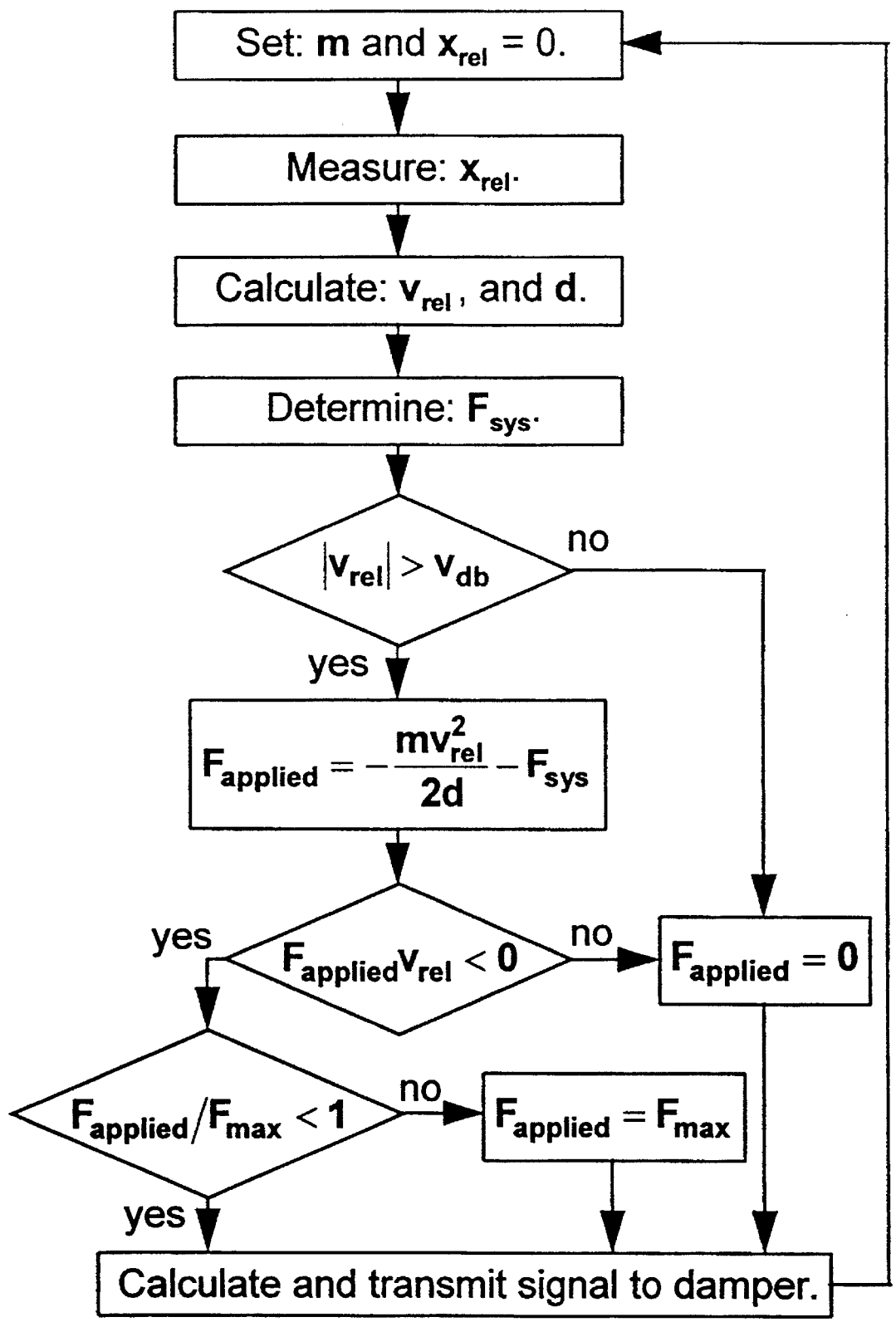

The applied force $F_{applied}$ block 86 of the controller 60 in FIG. 5 uses the state variables obtained by block 80 and calculated in block 82, and the $F_{sys}$ determined in block 84 to calculate the controlled force to be applied by the semi-active damper assembly 26. The control algorithms used to provide improved control and isolation of the sprung element 12, which includes operator 20, will subsequently be described in detail. The output of block 86 is a signal corresponding to the force to be applied $F_{applied}$ by the damper.

The output signal calculation block 88 converts the $F_{applied}$ signal into a (normally) electrical signal that is sent to power source 76 which in turn generates the appropriate control signal to achieve the desired $F_{applied}$ between elements 12 and 14 by the damper assembly 26. To determine what electrical signal is needed, the input/output characteristics of the power source 76 and the damping as a function relative motion of elements 12 and 14 of the damper assembly 26 must be defined. Where semi-active damper assembly 26 is an electrorheological damper, power source 76 could be a unipolar high voltage amplifier with gain "α" such that the output voltage "$V_{out}$" equals α times "$V_{in}$". If an output voltage "$V_{max}$" is required to achieve the maximum applied force "$F_{max}$" in the direction of $F_{applied}$ by the damper assembly 26 between sprung and unsprung elements 12 and 14, then the applied voltage "$V_{applied}$" required to achieve an applied force $F_{applied}$ is: $V_{applied}=V_{max}\sqrt{F_{applied}/F_{max}}$. Therefore, the electrical signal from block 88 for an electrorheological damper assembly 26, delivered to a high voltage amplifier 76, is a voltage signal equal to the $V_{applied}$ calculated above divided by α. If the approximation is made that the same applied voltage $V_{applied}$ achieves the same damping force independent of the direction of the relative motion within damper assembly 26, and it is further approximated that the magnitude of $F_{max}$ is the same for both jounce and rebound, then the applied voltage is $V_{applied}=V_{max}\sqrt{F_{applied}/F_{max}}$.

If the semi-active damper assembly 26, however, is a magnetorheological damper, the power source 76 could be a unipolar current amplifier with gain "β" such that the output current "$I_{out}$" equals β times "$I_{in}$". If an output current "$I_{max}$" is required to achieve the maximum applied force $F_{max}$ in the direction of $F_{applied}$ by the damper assembly 26 between sprung and unsprung elements 12 and 14, then the applied current "$I_{applied}$" required to achieve an applied force $F_{applied}$ is: $I_{applied}=I_{max} F_{applied}/F_{max}$. Therefore, the electrical signal from block 88 for a magnetorheological damper assembly 26, delivered to a current amplifier 76, is a current signal equal to the $I_{applied}$ calculated above divided by β.

If the semi-active damper assembly 26 employs a mechanical means to achieve variable damping, the power source 76 could be a pulse-width-modulated current supply such that when the percent "on" time "$t_{on}$" equals 100%, the damper achieves maximum applied force $F_{max}$. A percent "on" time to achieve Fapplied is: $t_{on}=100 F_{applied}/F_{max}$.

It is understood that depending on the type of power source 76 and input control signal required by the damper assembly, of whatever construction, output electrical signals from output signal calculation block 88 other than those described above can be used.

The applied force block 86 functions by means of one or more control algorithms programmed thereinto, to provide the improved control and isolation of the sprung mass for relative displacements $x_{rel}$ within the displacement limits $x_{+limit}$ and $x_{-limit}$. General characteristics of each of the control algorithms to be described are that: 1) each requires the input of certain system state variables, 2) each requires that the applied force $F_{applied}$ be set equal to zero whenever the calculated $F_{applied}$ is in the same direction as $v_{rel}$, since the semi-active damper assembly 26 can only apply a force that is opposite the direction of the relative velocity $v_{rel}$, 3) each requires that the applied force $F_{applied}$ be set equal to the maximum force achievable by the damper $F_{max}$ in the direction of $F_{applied}$ when the ratio of the calculated $F_{applied}$ to $F_{max}$ is greater than 1, and 4) each requires that when the absolute value of the relative velocity $|v_{rel}|$ is less than a preselected velocity deadband "$v_{db}$", the applied force $F_{applied}$ be set equal to zero. The purpose for a velocity deadband $v_{db}$ is primarily to minimize any perceived "harshness" of the system. While each of the algorithms subsequently described calculates an applied force $F_{applied}$ that is zero when the relative velocity $v_{rel}$ is zero, response time limitations of the damper assembly 26 and in the calculation speed may lead to a delay in determining $v_{rel}$ or calculating $F_{applied}$. If this happens, there could be a non-zero applied force $F_{applied}$ at the point when the relative velocity $v_{rel}$ changes direction. This phenomenon would introduce unacceptable friction-like harshness into the suspension system 10. Hence, a velocity deadband $v_{db}$ can be used to minimize the effects of such time delays on the suspension system and to minimize harshness.

The improved vibration control brought about in one important embodiment of the present invention comes through the explicit incorporation of $F_{sys}$ into the calculation of $F_{applied}$. The total applied force can be seen as composed of two components, a first calculated component, $F_{calc}$, as well as a second system component, $F_{sys}$, which is preferably taken to be a non-zero force as described above. $F_{calc}$ can be calculated by any of a variety of isolation and control algorithms, some of which are described in detail below. $F_{calc}$ is generally calculated from knowledge of the position and motion of the elements of the suspension in such a way as to be sufficient to tend to prevent the relative motion of the elements from exceeding predetermined limits. The preferred calculation of $F_{applied}$, as in the present invention, goes beyond this calculation, however, by explicitly subtracting the contribution of system forces, thereby providing an applied force more appropriate to efficient motion control.

Figure 4:
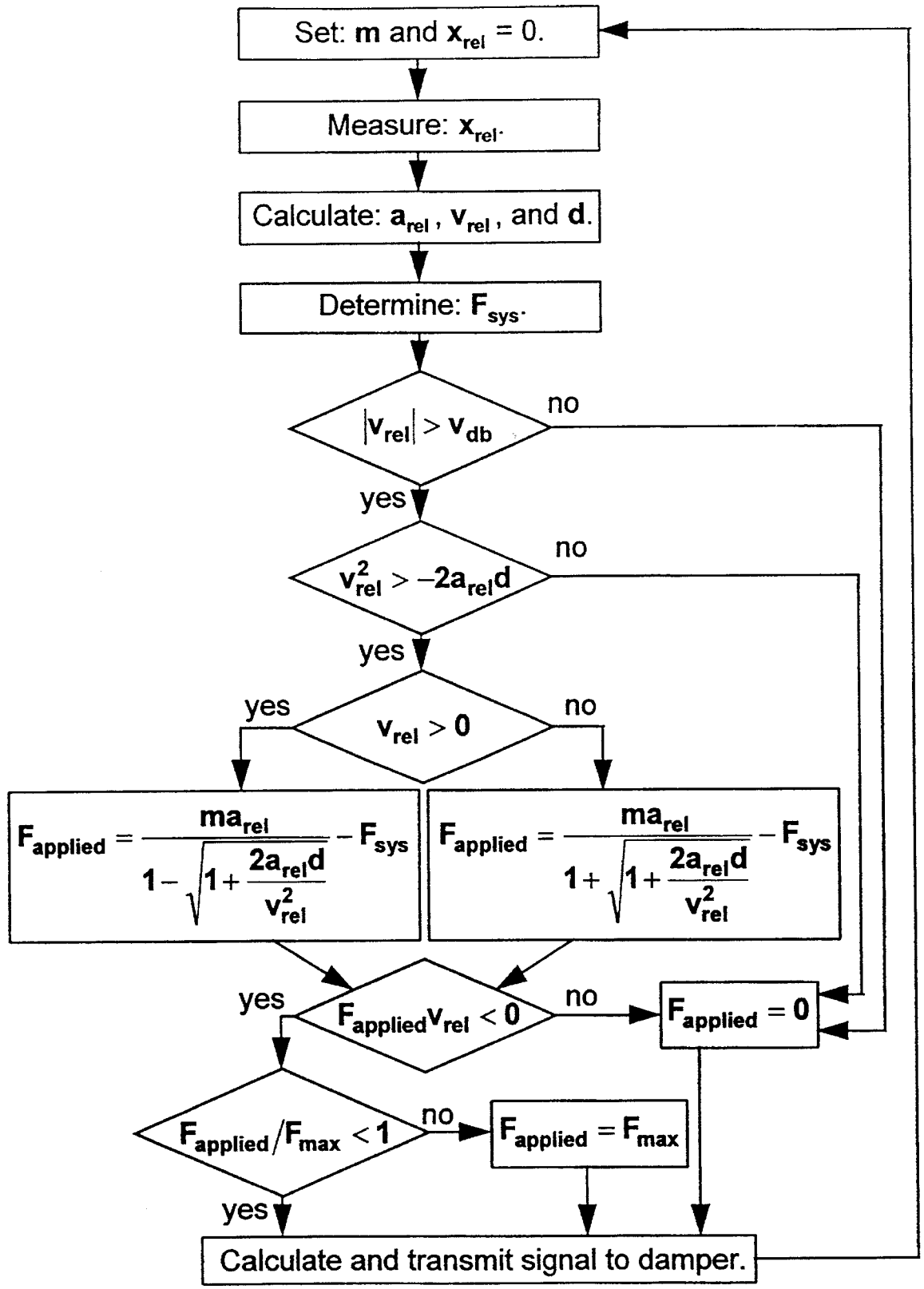
FIGS. 4 through 8 are block diagrams of controller and control algorithms suitable for the present invention.

FIG. 4 shows a block diagram of the controller containing a first algorithm (I) for controlling the relative motion between sprung and unsprung elements 12 and 14 of FIG. 1. This algorithm is designed principally to avoid large displacements, in which $x_{rel}$ exceeds $x_{+limit}$ or $x_{-limit}$. As described in the input, state-variables calculation, and system force calculation blocks of FIG. 3, the control process begins by setting the mass m and the equilibrium position of the relative displacement $x_{rel}$ to the time-averaged values obtained from the pressure sensor and the displacement sensor data. The instantaneous relative displacement $x_{rel}$ is measured, and the instantaneous relative velocity $v_{rel}$, the instantaneous relative acceleration $a_{rel}$, and the instantaneous distance to the acceptable extreme displacement d in the direction of relative velocity $v_{rel}$, are calculated. Additionally, the instantaneous system force $F_{sys}$ is calculated. These are the data employed by the algorithm.

The first step of the algorithm itself is to determine if the absolute value of the relative velocity $|v_{rel}|$ is greater than a preselected velocity deadband $v_{db}$. If the determination is "no", then the applied force $F_{applied}$ is set equal to zero and an electrical signal is sent to the power source to apply a control signal for zero applied force. If the determination is "yes", then a determination is made whether the relative velocity squared $v_{rel}^2$ is greater than $-2a_{rel}d$. If the determination is "no", then the applied force $F_{applied}$ is set equal to zero and an electrical signal is sent to the power source to apply a control signal for zero applied force. That is, if the direction of acceleration is away from the end stop in the direction of motion, and if the acceleration is sufficiently large that the end stop will not be encountered in any event, then no additional damping force is required. If the determination is "yes", however, then a further determination is made whether the relative velocity $v_{rel}$ is greater than zero. If the determination is "no", then the applied force is calculated by the following equation:

$$F_{applied} = \frac{ma_{rel}}{1 - \sqrt{1 + \frac{2a_{rel}d}{v_{rel}^2}}} - F_{sys},$$

and if the determination is "yes" then the applied force is calculated by the following equation:

$$F_{applied} = \frac{ma_{rel}}{1 + \sqrt{1 + \frac{2a_{rel}d}{v_{rel}^2}}} - F_{sys}.$$

In each of these formulas, the applied force $F_{applied}$ is calculated in such a way that it, in combination with the system force $F_{sys}$, is just sufficient to reduce the relative velocity to zero at the approaching limit, given the immediate relative acceleration $a_{rel}$, relative velocity $v_{rel}$, acceptable extreme displacement d, and system force $F_{sys}$. A determination is then made whether the thus calculated applied force $F_{applied}$ times the relative velocity $v_{rel}$ is less than zero. If the determination is "no", then the applied force $F_{applied}$ is set equal to zero and an electrical signal is sent to the power source to apply a control signal for zero applied force. (This is so because in semi-active systems, force can be applied only in the direction opposite to $v_{rel}$.) If the determination is "yes", then a determination is made whether the ratio of $F_{applied}$ to the maximum force $F_{max}$ achievable by the damper assembly 26 in the direction of $F_{applied}$ is less than 1. If the determination is "no", then the applied force $F_{applied}$ is set equal to maximum force $F_{max}$ and an electrical signal is sent to the power source to apply a control signal for maximum applied force $F_{max}$. If the determination is "yes", then an electrical signal is sent to the power source to apply a control signal for applied force $F_{applied}$. Once the electrical signal is transmitted to the power source for conversion to the control signal for the semi-active damper, the control process repeats.

FIG. 5 shows a block diagram of the controller containing a second algorithm (II) for controlling the relative motion between sprung and unsprung elements 12 and 14 of FIG. 1. This algorithm is likewise designed principally to avoid relative displacements $x_{rel}$ exceeding the displacement limits $x_{+limit}$ or $x_{-limit}$. As in the previous case, the control process begins by setting the mass m and the equilibrium position of the relative displacement $x_{rel}$ to the time-averaged values obtained from the pressure sensor and the displacement sensor data. The instantaneous relative displacement $x_{rel}$ is measured, and the instantaneous relative velocity $v_{rel}$ and the instantaneous distance to the acceptable extreme displacement d in the direction of relative velocity $v_{rel}$, are calculated. Additionally, the instantaneous system force $F_{sys}$ is calculated. These are the data employed by the algorithm.

The first step of the algorithm itself is to determine if the absolute value of the relative velocity $|v_{rel}|$ is greater than a preselected velocity deadband $v_{db}$. If the determination is "no", then the applied force $F_{applied}$ is set equal to zero and an electrical signal is sent to the power source to apply a control signal for zero applied force. If the determination is "yes", then the applied force is calculated by the following equation:

$$F_{applied} = -\frac{mv_{rel}^2}{2d} - F_{sys}.$$

Here the applied force $F_{applied}$, when combined with the system force $F_{sys}$, is just sufficient to reduce the relative velocity to zero, given only the current relative velocity $v_{rel}$, the current acceptable extreme displacement d and the current system force $F_{sys}$. A determination is then made whether the thus calculated applied force $F_{applied}$ times the relative velocity $v_{rel}$ is less than zero. If the determination is "no", then the applied force $F_{applied}$ is set equal to zero and an electrical signal is sent to the power source to apply a control signal for zero applied force. If the determination is "yes", then a determination is made whether the ratio of $F_{applied}$ to the maximum force $F_{max}$ achievable by the damper assembly 26 in the direction of $F_{applied}$ is less than 1. If the determination is "no", then the applied force $F_{applied}$ is set equal to maximum force $F_{max}$ and an electrical signal is sent to the power source to apply a control signal for maximum applied force $F_{max}$. If the determination is "yes", then an electrical signal is sent to the power source to apply a control signal for applied force $F_{applied}$. Once the electrical signal is transmitted to the power source for conversion to the control signal for the semi-active damper, the control process repeats.

Figure 6:
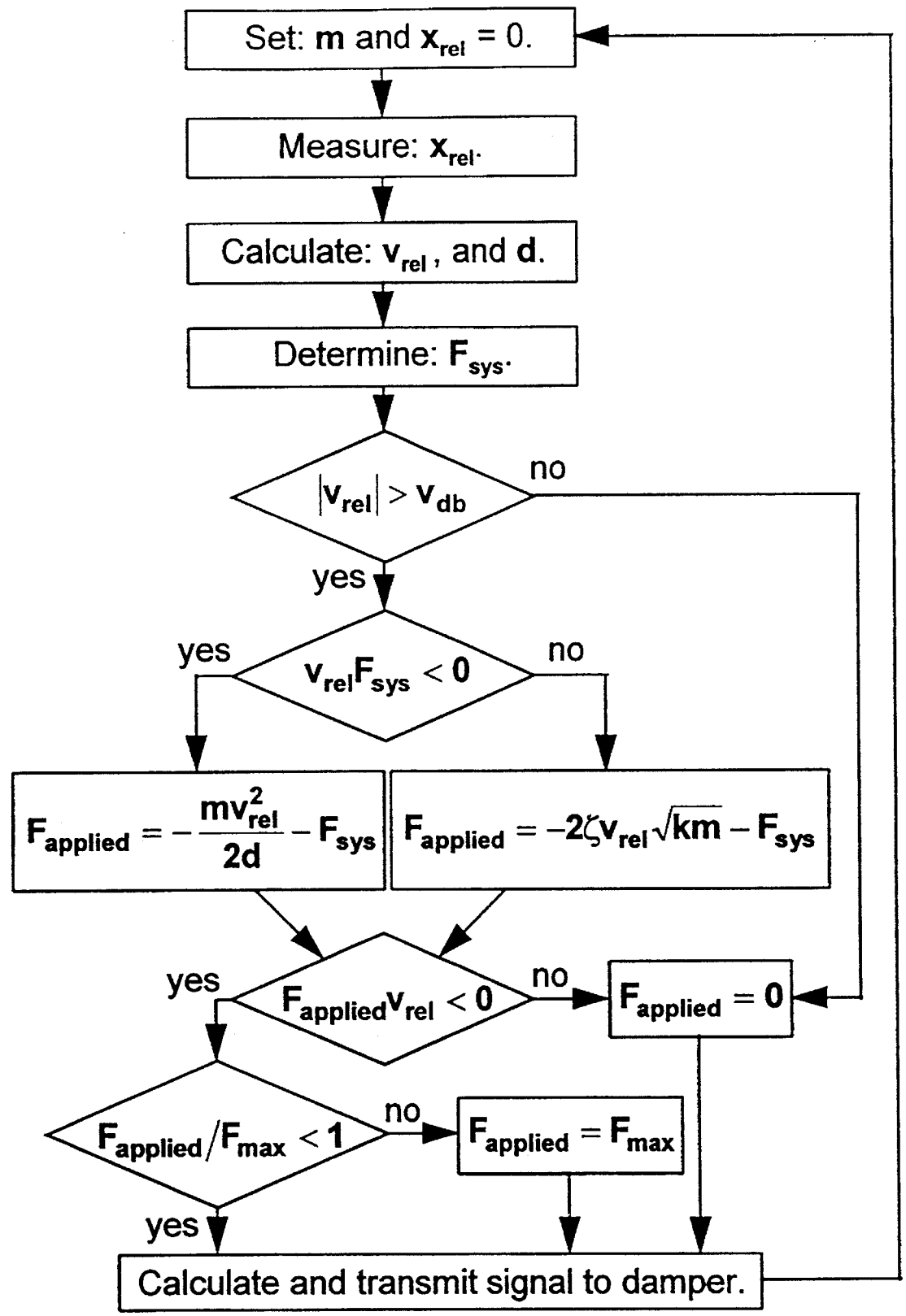

FIG. 6 shows a block diagram of the controller containing a third algorithm (III) for controlling the relative motion between sprung and unsprung elements 12 and 14 of FIG. 1. This algorithm is designed to provide good isolation in addition to maintaining the relative displacements $x_{rel}$ within the displacement limits $x_{+limit}$ and $x_{-limit}$. As in the previous cases, the control process begins by setting the mass m and the equilibrium position of the relative displacement $x_{rel}$ to the time average values obtained from the pressure sensor and the displacement data. The instantaneous relative displacement $x_{rel}$ is measured, and the instantaneous relative velocity $v_{rel}$ and the instantaneous distance to the acceptable extreme displacement d in the direction of relative velocity $v_{rel}$, are calculated. Additionally, the instantaneous system force $F_{sys}$ is calculated. These are the data employed by the algorithm.

As in all the algorithms, the first step is to determine if the absolute value of the relative velocity $|v_{rel}|$ is greater than a preselected velocity deadband $v_{db}$. If the determination is "no", then the applied force $F_{applied}$ is set equal to zero and a signal is sent to the power source to apply a control signal for zero applied force. If the determination is "yes", then a determination is made whether the relative velocity $v_{rel}$ is in the direction opposite to the system force $F_{sys}$. If the determination is "no", then the applied force is calculated by the following equation:

$$F_{applied} = -2\zeta v_{rel}\sqrt{km} - F_{sys},$$

where $\zeta$ is a number greater than or equal to zero and less than or equal to 1.0, and k is the spring rate of the system. This applied force $F_{applied}$ is essentially a viscous damping force that is linear in relative velocity $v_{rel}$, and which is corrected for the system force $F_{sys}$. For the damper assembly 26 to optimally apply this force, flow path 41 should be designed to have viscous damping that is greater than the $-2\zeta v_{rel}\sqrt{km}$ calculated above for the largest designed (or anticipated) value of m. If the determination is "yes", the applied force is calculated by the following equation:

$$F_{applied} = -\frac{mv_{rel}^2}{2d} - F_{sys}.$$

Here the applied force $F_{applied}$, when combined with the system force $F_{sys}$, is just sufficient to reduce the relative velocity to zero, given only the immediate relative velocity $v_{rel}$, acceptable extreme displacement d, and system force $F_{sys}$. A determination is then made whether the thus calculated applied force $F_{applied}$, multiplied by the relative velocity $v_{rel}$, is less than zero. If the determination is "no", then the applied force $F_{applied}$ is set equal to zero and an electrical signal is sent to the power source to apply a control signal for zero applied force. If the determination is "yes", then a determination is made whether the ratio of $F_{applied}$ to the maximum force $F_{max}$ achievable by the damper assembly 26 in the direction of $F_{applied}$ is less than 1. If the determination is "no", then the applied force $F_{applied}$ is set equal to maximum force $F_{max}$ and an electrical signal is sent to the power source to apply a control signal for maximum applied force $F_{max}$. If the determination is "yes", then an electrical signal is sent to the power source to apply a control signal for applied force $F_{applied}$. Once the electrical signal is transmitted to the power source for conversion to the control signal for the semi-active damper, the control process repeats.

Figure 7:
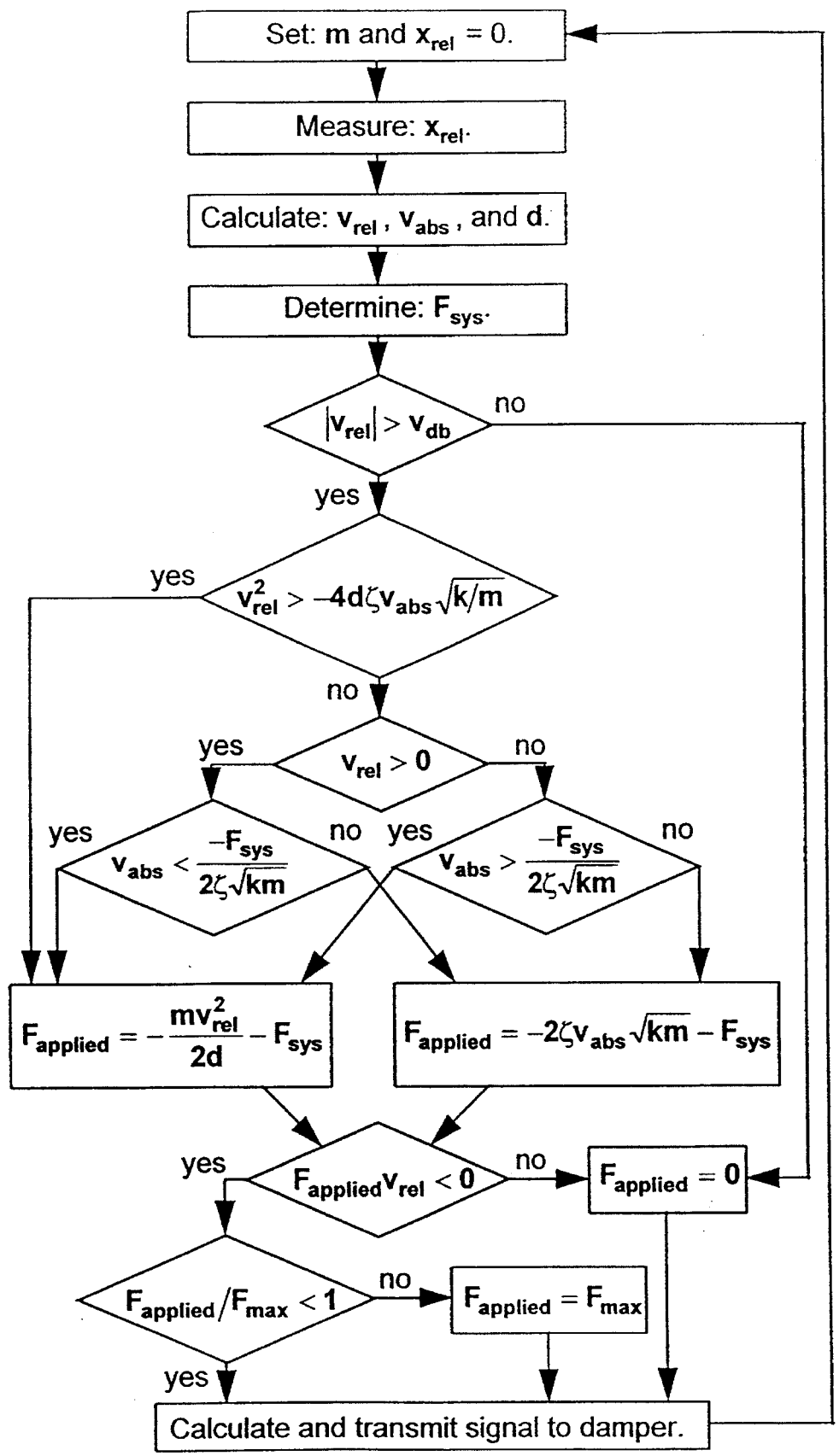

FIG. 7 shows a block diagram of the controller containing a forth algorithm (IV) for controlling the relative motion between sprung and unsprung elements 12 and 14 of FIG. 1. As with algorithm III, this algorithm is designed to provide good isolation in addition to maintaining the relative displacements $x_{rel}$ within the displacement limits $x_{+limit}$ and $x_{-limit}$. Again, the control process begins by setting the mass m and the equilibrium position of the relative displacement $x_{rel}$ to the time average values obtained from the pressure sensor and the displacement data. The instantaneous relative displacement $x_{rel}$ and the absolute acceleration $a_{abs}$ of element 12 are measured, and the instantaneous relative velocity $v_{rel}$, the instantaneous absolute velocity $v_{abs}$, and the instantaneous distance to the acceptable extreme displacement d in the direction of relative velocity $v_{rel}$, are calculated. Additionally, the instantaneous system force $F_{sys}$ is calculated. These are the data employed by the algorithm.

A determination is made whether the absolute value of the relative velocity $|v_{rel}|$ is greater than a preselected velocity deadband $v_{db}$. If the determination is "no", then the applied force $F_{applied}$ is set equal to zero and an electrical signal is sent to the power source to apply a control signal for zero applied force. If the determination is "yes", the following determination is made: whether $$v_{rel}^2 > -4d\zeta v_{abs}\sqrt{k/m},$$

where $\zeta$ is a number greater than zero, but which is preferably greater than 0.5 and less than 3. If the determination is "yes", then the applied force is calculated by the following equation:

$$F_{applied} = -\frac{mv_{rel}^2}{2d} - F_{sys}. \quad \text{(a)}$$

Here the applied force $F_{applied}$, when combined with the system force $F_{sys}$, is just sufficient to reduce the relative velocity to zero, given only the immediate relative velocity $v_{rel}$, acceptable extreme displacement d, and system force $F_{sys}$. If the determination is "no", then a determination is made whether the relative velocity $v_{rel}$ is greater than zero. If the relative velocity $v_{rel}$ is greater than zero then the following determination is made: whether $$v_{abs} < \frac{-F_{sys}}{2\zeta\sqrt{km}}. \quad \text{(b)}$$

If the relative velocity $v_{rel}$ is less than zero then the following determination is made: whether $$v_{abs} > \frac{-F_{sys}}{2\zeta\sqrt{km}}. \quad \text{(c)}$$

In either case (b) or (c), if the determination is "no", then the applied force is calculated by the following equation:

$$F_{applied} = -2\zeta v_{abs}\sqrt{km} - F_{sys},$$

which is the force that would be applied by an imaginary damper between an inertial reference frame, which for the purposes describe here can be defined as $v_{abs}$ equal 0, and the sprung element 12. In either case (b) or (c), if the determination is "yes", then the applied force is calculated by equation (a). A determination is then made whether the thus calculated applied force $F_{applied}$ times the relative velocity $v_{rel}$ is less than zero. If the determination is "no", then the applied force $F_{applied}$ is set equal to zero and an electrical signal is sent to the power source to apply a control signal for zero applied force. If the determination is "yes", then a determination is made whether the ratio of $F_{applied}$ to the maximum force $F_{max}$ achievable by the damper assembly 26 in the direction of $F_{applied}$ is less than 1. If the determination is "no", then the applied force $F_{applied}$ is set equal to maximum force $F_{max}$ and an electrical signal is sent to the power source to apply a control signal for maximum applied force $F_{max}$. If the determination is "yes", then an electrical signal is sent to the power source to apply a control signal for applied force $F_{applied}$. Once the electrical signal is transmitted to the power source for conversion to the control signal for the semi-active damper, the control process repeats.

Figure 8:
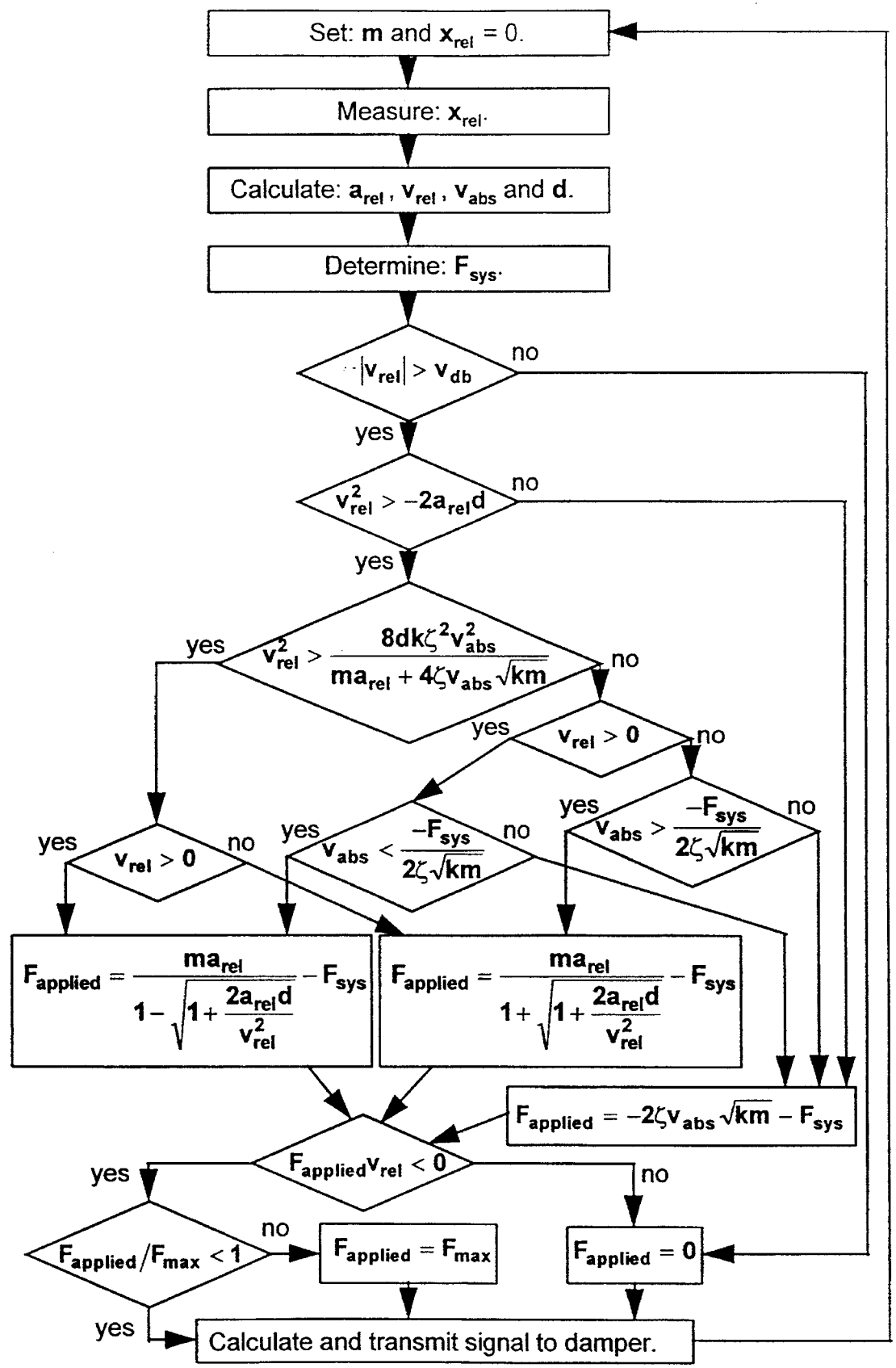

FIG. 8 shows a block diagram of the controller containing a fifth algorithm (V) for controlling the relative motion between sprung and unsprung elements 12 and 14 of FIG. 1. As with algorithms III and IV, this algorithm is designed to provide good isolation in addition to maintaining the relative displacements $x_{rel}$ within the displacement limits $x_{+limit}$ and $x_{-limit}$. The mass m and the equilibrium position of the relative displacement $x_{rel}$ are set to the time averaging values obtained from the pressure sensor and the displacement sensor data. The instantaneous relative displacement $x_{rel}$ and the absolute acceleration $a_{abs}$ of element 12 are measured and the instantaneous relative velocity $v_{rel}$, the instantaneous absolute velocity $v_{abs}$, and the instantaneous distance to the acceptable extreme displacement d in the direction of relative velocity $v_{rel}$, are calculated. Additionally, the instantaneous system force $F_{sys}$ is calculated. These are the data employed by the algorithm.

The algorithm first determines if the absolute value of the relative velocity $|v_{rel}|$ is greater than a preselected velocity deadband $v_{db}$. If the determination is "no", then the applied force $F_{applied}$ is set equal to zero and an electrical signal is sent to the power source to apply a control signal for zero applied force. If the determination is "yes", then a determination is made whether the relative velocity squared $v_{rel}^2$ is greater than $-2a_{rel}d$. If the determination is "no", then the applied force is calculated by the following equation:

$$F_{applied} = -2\zeta v_{abs} \sqrt{km} - F_{sys}, \quad (d)$$

which is the force that would be applied by an imaginary damper between an inertial reference frame, which for the purposes describe here can be defined as $v_{abs}$ equal 0, and the sprung element 12, where $\zeta$ is a number greater than zero, but which is preferably greater than 0.5 and less than 3. If the determination is "yes", then the following determinations are made: whether $$v_{rel}^2 > \frac{8dk\zeta^2 v_{abs}^2}{ma_{rel} + 4\zeta v_{abs}\sqrt{km}} \quad (e)$$

$$v_{rel} > 0. \quad (f)$$

If determinations (e) and (f) are both "yes" and then the applied force is calculated by the following equation:

$$F_{applied} = \frac{ma_{rel}}{1 - \sqrt{1 + \frac{2a_{rel}d}{v_{rel}^2}}} - F_{sys}, \quad (g)$$

and if the determination (e) is "yes" and the determination (f) is "no" then the applied force is calculated by the following equation:

$$F_{applied} = \frac{ma_{rel}}{1 + \sqrt{1 + \frac{2a_{rel}d}{v_{rel}^2}}} - F_{sys}. \quad (h)$$

In each of these formulas, the applied force $F_{applied}$ is calculated in such a way that it, in combination with the system force $F_{sys}$, is just sufficient to reduce the relative velocity to zero at the approaching limit, given the immediate relative acceleration $a_{rel}$, relative velocity $v_{rel}$, acceptable extreme displacement d, and system force $F_{sys}$. If determination (e) is "no" and (f) is "yes", then the following determination is made: whether $$v_{abs} < \frac{-F_{sys}}{2\zeta \sqrt{km}}.$$

If the determination is "yes" then the applied force $F_{applied}$ is calculated by equation (g), and if the determination is "no" then the applied force $F_{applied}$ is calculated by equation (d). If determinations (e) and (f) are both "no", then the following determination is made: whether $$v_{abs} > \frac{-F_{sys}}{2\zeta \sqrt{km}}.$$

If the determination is "yes" then the applied force $F_{applied}$ is calculated by equation (h), and if the determination is "no" then the applied force $F_{applied}$ is calculated by equation (d). A determination is then made whether the thus calculated applied force $F_{applied}$ times the relative velocity $v_{rel}$ is less than zero. If the determination is "no", then the applied force $F_{applied}$ is set equal to zero and an electrical signal is sent to the power source to apply a control signal for zero applied force. If the determination is "yes", then a determination is made whether the ratio of $F_{applied}$ to the maximum force $F_{max}$ achievable by the damper assembly 26 in the direction of $F_{applied}$ is less than 1. If the determination is "no", then the applied force $F_{applied}$ is set equal to maximum force $F_{max}$ and an electrical signal is sent to the power source to apply a control signal for maximum applied force $F_{max}$. If the determination is "yes", then an electrical signal is sent to the power source to apply a control signal for applied force $F_{applied}$. Once the electrical signal is transmitted to the power source for conversion to the control signal for the semiactive damper, the control process repeats.

The scope of the invention described in algorithms I, II, III, IV and V is for relative displacements $x_{rel}$ of elements 12 and 14 within the displacement limits $x_{+limit}$ and $x_{-limit}$, so as to provide isolation while maintaining these relative displacement within the limits. In some cases, however, the relative displacement $x_{rel}$ can extend beyond the limits $x_{+limit}$ and $x_{-limit}$. If there are large inputs to the supporting element 14, and the limits $x_{+limit}$ and $x_{-limit}$ are set less than the mechanical stops 51 and 53, or the impact dampers 56 and 58 are sufficiently deformable, significant travel of the mechanical linkage 50 beyond the limits can occur. It is understood that under these conditions an alternative embodiment of the present invention includes, in addition to the applied force $F_{applied}$ calculated by the algorithms I, II, III, IV and V, provisions for applying a force for relative displacements beyond the limits. For example, the applied force $F_{applied}$ be set equal to $F_{max}$ for $x_{rel}$ greater than $x_{+limit}$ or less than $x_{-limit}$. Alternatively, if the absolute value of the relative velocity $|v_{rel}|$ is greater than a preselected velocity deadband "$v_{db}$", and if $x_{rel}$ is greater than $x_{+limit}$ or less than $x_{-limit}$ then the applied force $F_{applied}$ be set equal to $F_{max}$ if $x_{rel}v_{rel}$ is greater than zero but be set equal to zero if $x_{rel}v_{rel}$ is less than zero. It is understood that other options could be used for calculating the applied force $F_{applied}$ for relative displacements $x_{rel}$ outside the displacement limits $x_{+limit}$ and $x_{-limit}$, and such options do not alter the spirit of the invention.

It is also understood that the invention as described in algorithms I, II, III, IV and V could be included within a system that includes two or more independently controlled suspension mechanisms 5, such as an automotive suspension where the four suspension mechanism corresponding to those at each of the four wheel locations. In such a system each location can be individually controlled and, in addition to the invention described above for isolating and controlling each of the individual suspensions, a central controller could override or bias the applied force $F_{applied}$ at each of the suspension locations based on combined inputs from all the suspension mechanism, or from other inputs. The fact that additional information beyond the system variables of an individual suspension may be used as a basis for an override or biasing of the applied force does not alter the spirit of the invention.

EXAMPLES

To demonstrate improvement in controlling the relative motion between two elements to minimize the instances of the motion exceeding acceptable limits while maximizing isolation between the elements using the current invention, a computer model is used. This model compares the performance of a suspension system using an adjustable damper controlled by the algorithms of the current invention to the performance of a suspension system using 1) a passive damper with relatively high damping designed to limit the relative motion between the two elements, and 2) the adjustable damper in the "off" state. The adjustable damper in the "off" is essentially a relatively low damped passive damper. The system modeled is a seat suspension with a sprung mass m equal to 95 kg. The primary spring assembly 24 has a spring constant k equal to 5.86 kN/m resulting in a natural frequency of 1.25 Hz for the seat. The displacement from the equilibrium position $x_{rel}=0$ to the positive and negative displacement limits $x_{+limit}$ and $x_{-limit}$ of the suspension mechanism 5 are +50 mm and −50 mm respectively. The end stops 51 and 53 are modeled to be rubber bushings with a linear spring rate of 900 kN/m. The passive damper modeled is a linear damper that applies a force between elements 12 and 14 equal to 0.5 times the critical damping parameter times the relative velocity $\{F_{jounce}=0.5(2\sqrt{km})v_{rel}\}$ in the jounce direction, and equal to 0.67 times critical damping times the relative velocity $\{F_{rebound}=0.67(2\sqrt{km})v_{rel}\}$ in the rebound direction. The semi-active damper assembly 26 modeled applies a force between elements 12 and 14 equal to 0.15 times the critical damping parameter times the relative velocity $\{F_{off}=0.15(2\sqrt{km})v_{rel}\}$ when "off". Flow path 41 is tuned to correspond to a linear damper that limits the force applied between elements 12 and 14 to 1 times the critical damping parameter times the relative velocity $\{\text{Force}=2\sqrt{km}\ v_{rel}\}$. The maximum force $F_{max}$ that can be applied between elements 12 and 14 by the damper assembly 26 is $F_{max}=450N$ in both jounce and rebound directions. For algorithm III, $\zeta$ is set equal to 0.6, and for algorithms IV and V, $\zeta$ is set equal to 1. For algorithms I and V, the relative acceleration $a_{rel}$ is filtered using a second-order low-pass filter with a corner frequency of 8 Hz. The total response time of the semi-active system including the controller 60, power source 76 and damper assembly 26 is set equal to 0.005 seconds.

Figure 9:
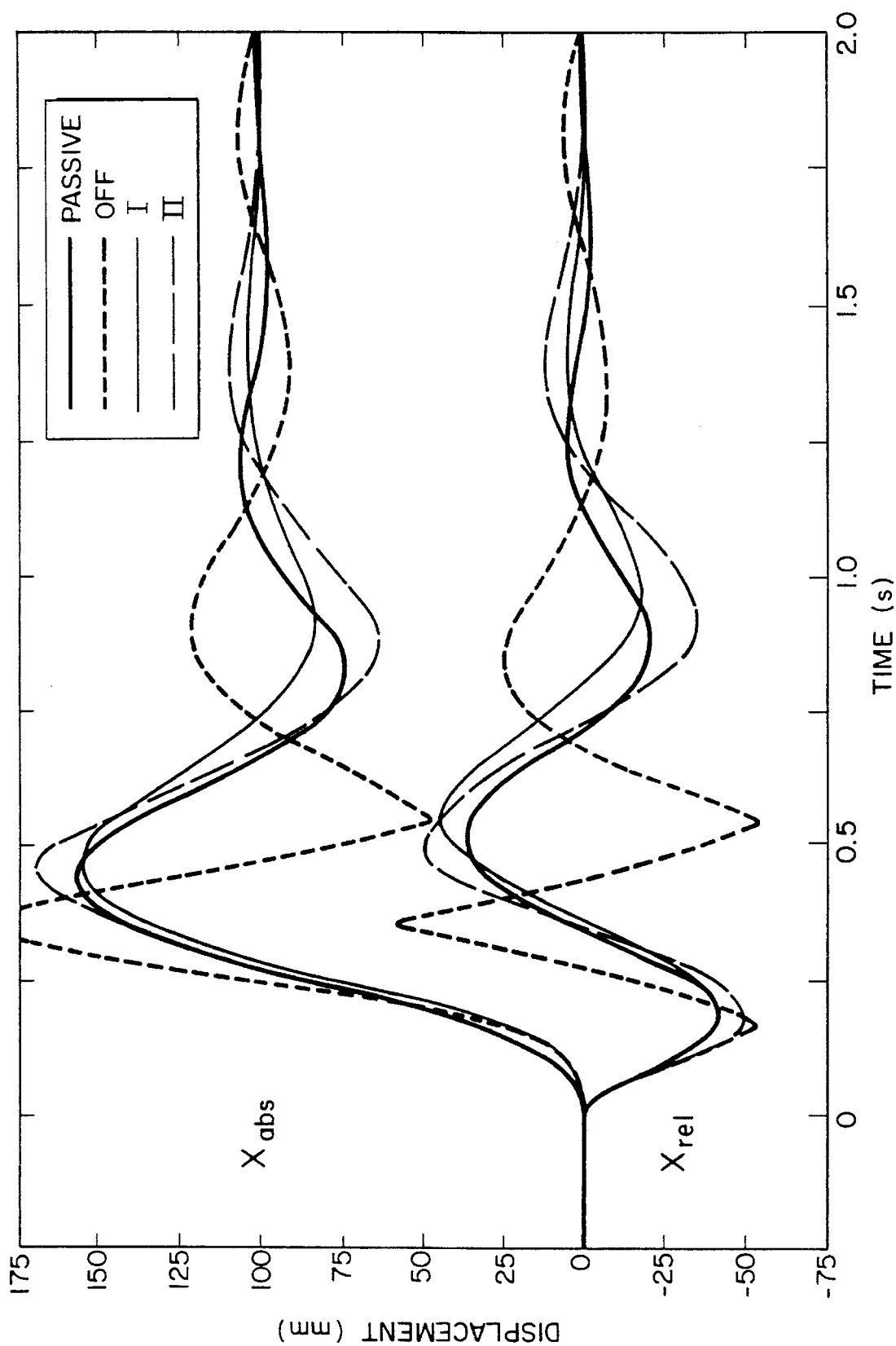
FIG. 9 is a plot of relative and absolute displacements of a suspension subjected to a step input while controlled by the algorithms of FIGS. 4 and 5.
Figure 11:
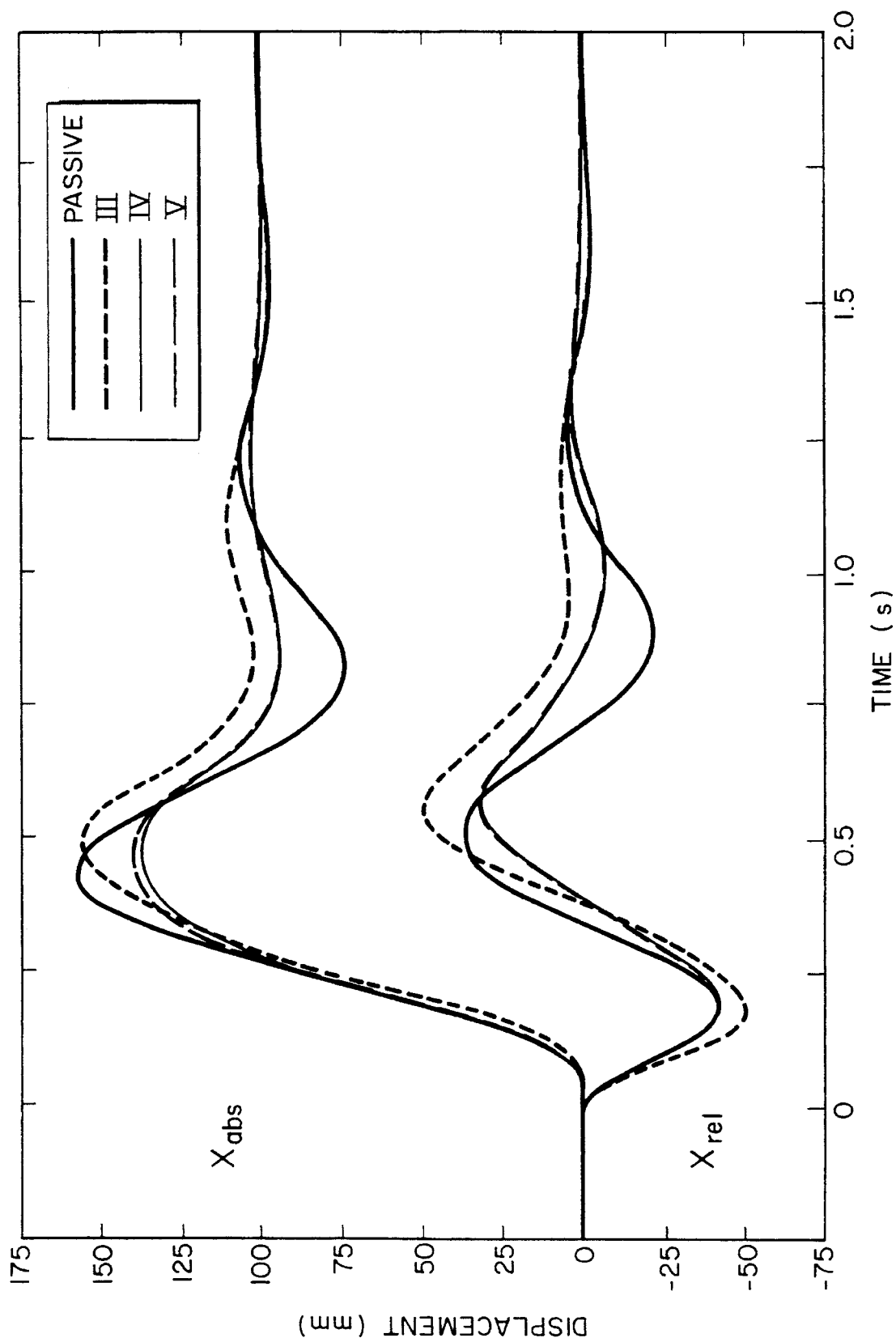
FIG. 11 is a plot of relative and absolute displacements of a suspension subjected to a step input while controlled by the algorithms of FIGS. 6, 7 and 8.
Figure 13:
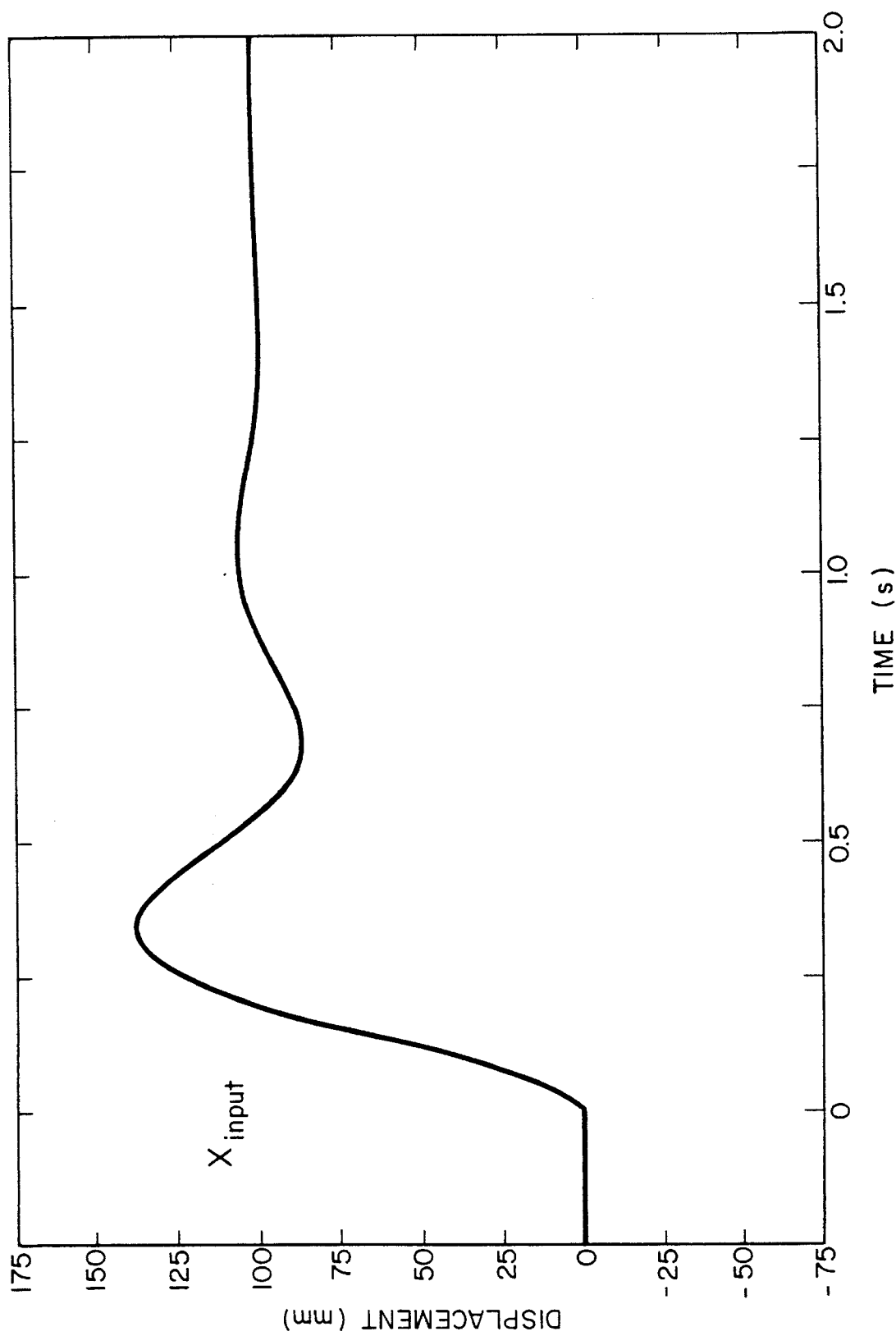
FIG. 13 is the displacement input to the suspension when generating the plots of FIGS. 9 and 11.

To demonstrate the algorithm's ability to avoid large displacements in which $x_{rel}$ exceeds $x_{+limit}$ and $x_{-limit}$, FIGS. 9 and 11 show the relative displacement $x_{rel}$ and absolute displacement $x_{abs}$ for a seat 10 mounted on a vehicle cab 16, where a 100 mm step input is applied to the cab suspension. The suspension of the vehicle cab is modeled to have a natural frequency of 1.5 Hz and a damping ratio of 0.3, such that the resulting displacement input to the base 22 of the seat 10 is shown in FIG. 13.

Figure 10:
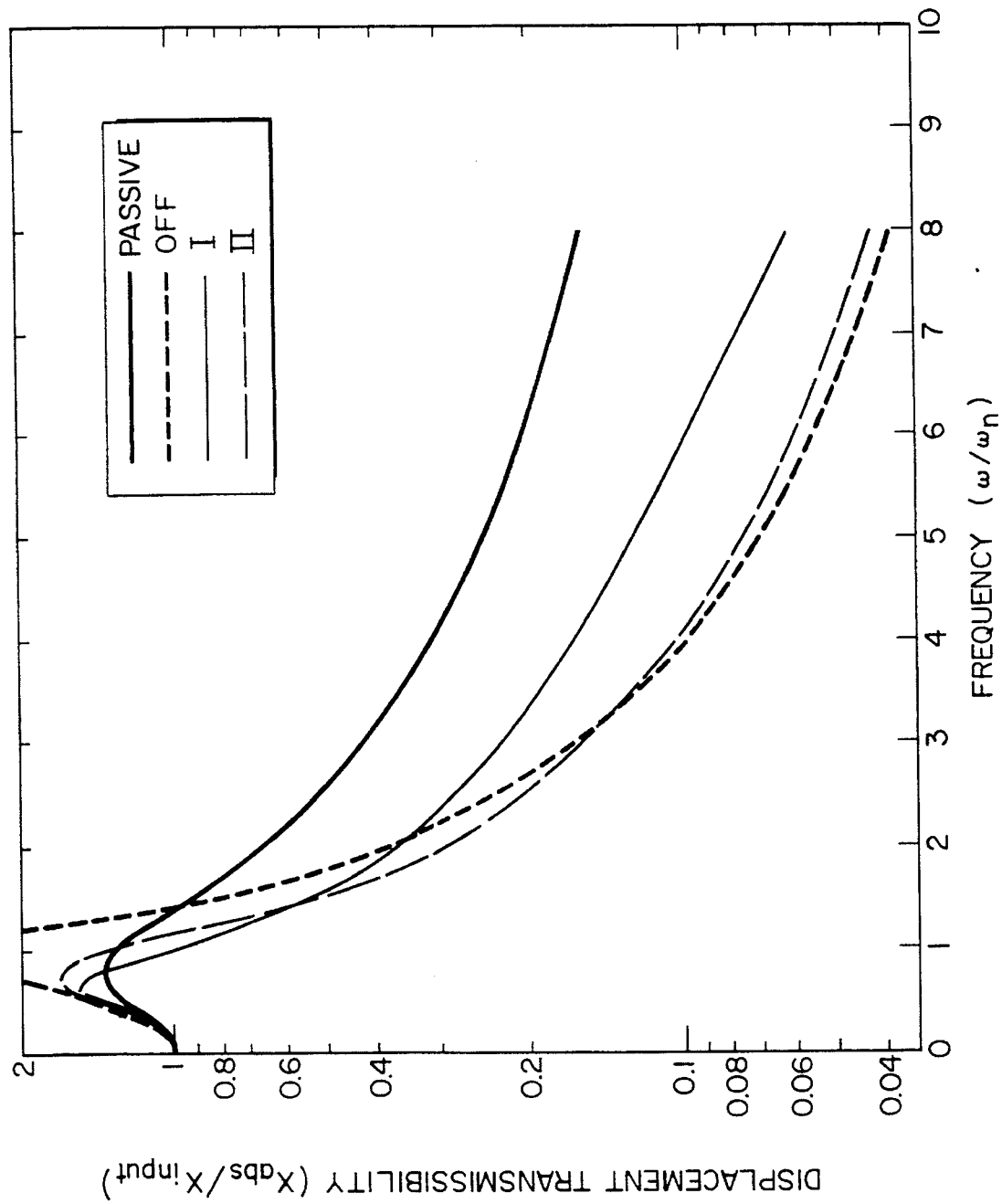
FIG. 10 is a displacement transmissibility plot of the control algorithms of FIGS. 4 and 5.
Figure 12:
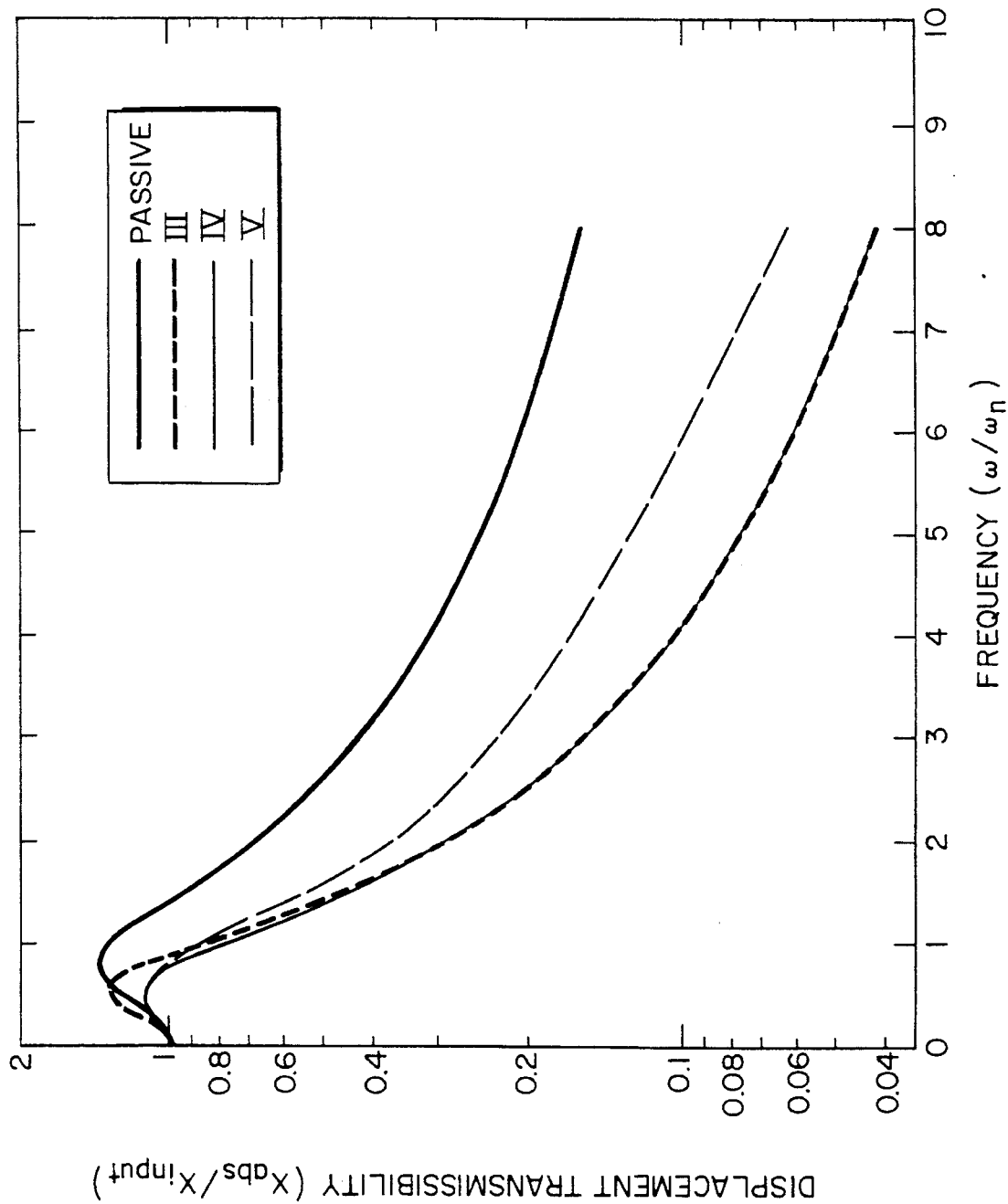
FIG. 12 is a displacement transmissibility plot of the control algorithms of FIGS. 6, 7 and 8.

To demonstrate isolation of the control algorithms, FIGS. 10 and 12 show the displacement transmissibility, which is the absolute displacement $x_{abs}$ of the sprung element 12 divided by the displacement of the unsprung element 14, as a function of frequency ratio (input frequency divided by natural frequency $\omega/\omega_n$) for a steady-state input. The frequency ratio is varied from 0.25 times the natural frequency (0.31 Hz) to 8 times the natural frequency (10 HZ). For frequency ratios greater than or equal to 1, the displacement input is selected for a 2.35 m/sec² acceleration. Hence, at 1.25 Hz, the input displacement is ±38 mm. At frequency ratios less than 1, the displacement input is ±40 mill.

Referring now to FIG. 9, the relative displacement $x_{rel}$ and absolute displacement $x_{abs}$ curves for the adjustable damper in the "off" state demonstrate curves of a seat suspension that exceed the stroke limits of the suspension. The abrupt changes in direction are due to contact with the end stops 51, 53. The "off" adjustable damper exceeds the stroke limit three times before sufficient damping occurs to control the motion of the seat between the displacement limits. The low damped passive damper is not suited to control the large input modeled here. Indeed the "off" adjustable damper can only control the displacement of the seat within the displacement limits for transient inputs of the type modeled here with amplitudes less than 51 mm. The highly damped passive damper demonstrates good control of the transient input with the suspension displacement remaining within the displacement limits. The highly damped passive damper can control the displacement of the seat within the displacement limits for transient inputs of the type modeled here up to an amplitude of 121 mm. The adjustable damper controlled by algorithm II is just exceeding the displacement limit in the rebound stroke of the relative displacement $x_{rel}$. With the modeled parameters for the adjustable damper, algorithm II is able to increase the maximum input for the seat suspension before exceeding the stroke limit for the transient input modeled here from 51 mm in the "off" state to 97 min. The adjustable damper controlled by algorithm I is controlled well within the acceptable displacement limits. Inputs of the type modeled here up to 155 mm are controlled by algorithm I using the adjustable damper modeled in this example.

Referring now to FIG. 10, the isolation of the dampers of FIG. 9 are demonstrated in a displacement transmissibility plot. The lower the transmissibility, the better the isolation provided by the suspension. The highly damped passive damper provides the best low frequency isolation. However, the highly damped passive damper has poor high frequency isolation. The "off" adjustable damper has unacceptable isolation at the natural frequency of the suspension (frequency ratio equal 1); however, the "off" damper has the best isolation at the frequency ratios above 4. The adjustable damper controlled by either algorithm I or II shows superior isolation at the low frequency compared to the "off" adjustable damper, and shows superior isolation at the high frequencies compared to the highly damped passive damper.

In comparison with the highly damped passive damper, the adjustable damper controlled by algorithm I has both better control of the suspension displacement due to transient inputs than the highly damped passive damper, and significantly improved high frequency isolation. In comparison with the "off" passive damper, the adjustable damper controlled by algorithm II has essentially the same high frequency isolation with improved control of the relative displacement within the acceptable displacement limits.

Referring now to FIG. 11, the relative displacement $x_{rel}$ and absolute displacement $x_{abs}$ curves for the adjustable damper controlled algorithms III, IV and V, which combine isolation control with displacement control are compared to the highly damped passive damper. Each of the algorithms demonstrate the ability to more rapidly reduce the motions of the absolute displacement $x_{abs}$ with algorithms IV and V providing the best performance. As before, the maximum transient input of the type modeled here that the highly damped passive damper can control without having the relative displacement exceed the displacement limits is 121 mm. With the modeled parameters for the adjustable damper, algorithms III and IV can control a transient input up to 111 mm, and algorithm V can control a transient input of the type modeled here of up to 155 mm.

Referring now to FIG. 12, the isolation of the dampers of FIG. 11 are demonstrated in a displacement transmissibility plot. The adjustable damper controlled by algorithms IV and V has significantly superior isolation when compared to the passive damper over the entire frequency range, with algorithm IV having better high frequency isolation than algorithm V. The adjustable damper controlled by algorithm III has significantly superior isolation when compared to the highly damped passive damper at all frequency ratios above 0.6, and is essentially equal in isolation at frequency ratios below 0.6. In general, the adjustable damper with algorithms III, IV and V provides superior isolation to the highly damped passive damper while controlling suspension displacement due to transient inputs.

Each of the documents referred to above is incorporated herein by reference. As used herein, the expression "consisting essentially of" permits the inclusion of substances which do not materially affect the basic and novel characteristics of the composition under consideration.

What is claimed is:

1. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being provided with a means for applying a second, controlled, force therebetween; said method comprising:

(a) measuring the displacement $x_{rel}$ of the second element relative to the first element, $x_{rel}$ being defined as zero at the equilibrium position;

(b) determining the relative velocity $v_{rel}$ between said first and second elements;

(c) calculating a force $F_{applied}$ defined as:

$$F_{applied} = F_{calc} - F_{sys}$$

where $F_{calc}$ is a force, calculated from data determined from knowledge of the position and motion of the elements, sufficient to prevent the relative motion of the elements from exceeding predetermined limits, and $F_{sys}$ is a nonzero sum of the forces acting between the first and second elements other than the controlled force applied by the second force means, provided that $F_{applied} = 0$ if said force $F_{applied}$ is in the same direction as the relative velocity $v_{rel}$ of the elements, or if $|v_{rel}| \leq v_{db}$, where $v_{db}$ is a velocity deadband with a preselected value greater than or equal to zero, and $F_{applied} = F_{max}$ if said force $F_{applied}$ is in direction opposite the relative velocity $v_{rel}$ of the elements, and greater than the maximum force $F_{max}$ that can be applied by the second force means in the direction of $F_{applied}$; and (d) applying said force $F_{applied}$ between the first and second elements;

whereby the force transmitted from the first element to the second element and the relative displacement between said elements are controlled.

2. The method of claim 1 wherein the displacement $x_{rel}$ is measured by a displacement transducer.

3. The method of claim 1 wherein the relative velocity of the elements $v_{rel}$ is calculated by differentiation of the relative displacement $x_{rel}$ using a digital filter.

4. The method of claim 1 wherein the calculations are performed electronically and a signal corresponding to the force $F_{applied}$ is electronically transmitted to an adjustable damper.

5. The method of claim 4 wherein the adjustable damper contains a field responsive fluid.

6. The method of claim 5 wherein the field responsive fluid is an electrorheological fluid.

7. The method of claim 6 wherein the signal applied to the electro-rheological-fluid adjustable damper is a voltage $V_{applied}$ $$V_{applied} = V_{max}\sqrt{\frac{F_{applied}}{F_{max}}},$$

where $V_{max}$ is the voltage applied to the damper to achieve $F_{max}$ in the direction of $F_{applied}$.

8. The method of claim 5 wherein the field responsive fluid is a magnetorheological fluid.

9. The method of claim 8 wherein the signal applied to the magnetorheological damper is a current $I_{applied}$ $$I_{applied} = I_{max} F_{applied}/F_{max},$$

where $I_{max}$ is the current applied to the damper to achieve $F_{max}$ in the direction of $F_{applied}$.

10. The method of claim 1 wherein the first element comprises a vehicle body and the second element comprises an engine, a tractor cab, or a seat, suspended thereon.

11. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second, controlled, force therebetween; said method comprising:

(a) measuring the displacement $x_{rel}$ of the second element relative to the first element, $x_{rel}$ being defined as zero at the equilibrium position;

(b) calculating the (i) relative velocity $v_{rel}$ and (ii) relative acceleration $a_{rel}$ of the elements;

(c) calculating an applied force $F_{applied}$, defined as $$F_{applied} = \frac{ma_{rel}}{1 - \sqrt{1 + \frac{2a_{rel}d}{v_{rel}^2}}} - F_{sys} \quad \text{if } v_{rel} > 0 \quad \text{(condition 1)}$$

and $v_{rel}^2 > -2a_{rel}d$, $$F_{applied} = \frac{ma_{rel}}{1 + \sqrt{1 + \frac{2a_{rel}d}{v_{rel}^2}}} - F_{sys} \quad \text{if } v_{rel} < 0 \quad \text{(condition 2)}$$

and $v_{rel}^2 > -2a_{rel}d$, $F_{applied} = 0$ if $|v_{rel}| \leq v_{db}$, or conditions 1 and 2 are not met;

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means, and (d) applying said force $F_{applied}$ between the first and second elements; provided that
  (i) if the direction of said force $F_{applied}$ is in the same direction as the relative velocity $v_{rel}$, then said force $F_{applied}=0$,
  (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;
whereby the force transmitted and the relative displacement between said elements are controlled.

12. The method of claim 11 further comprising in step (a) measuring the absolute acceleration of the two elements and calculating the relative acceleration $a_{rel}$ therefrom.

13. The method of claim 11 wherein the relative acceleration $a_{rel}$ is calculated from the relative velocity using a digital filter.

14. The method of claim 11 wherein the instantaneous relative acceleration $a_{rel}$ used in the calculation of $F_{applied}$ is filtered using a second-order low-pass filter with a corner frequency of between 2 and 20 times $\sqrt{k/m}$, where k is the spring rate of the spring assembly at the equilibrium position.

15. The method of claim 11 where $F_{sys}$ is approximated by $F_{sys}=-kx'-Cv_{rel}$, where x' is the relative displacement of the elements in excess of a displacement deadband $x_{db}$, with a value of zero or greater, such that $x'=0$ if $|x_{rel}|\leq x_{db}$ and $x'=x_{rel}-x_{db}\,\text{sgn}(x_{rel})$ if $|x_{rel}|>x_{db}$, k is the spring rate of the spring assembly at the relative displacement $x_{rel}$, and C is an adjustable constant.

16. The method of claim 15 wherein the spring rate k at each relative displacement $x_{rel}$ is taken to be a constant equal to the spring rate at the equilibrium position.

17. The method of claim 11 where $F_{sys}$ is approximated by zero.

18. The method of claim 11 wherein the second element is a seat and an occupant thereof, and wherein mass m is the portion of the total mass of the seat and the occupant which is supported through said linkage when said seat and occupant are at rest.

19. The method of claim 11 wherein the first element is a wheel assembly and the second element comprises a vehicle body, and wherein mass m is taken as that portion of the total mass of the vehicle body which is supported by said wheel assembly when said vehicle body is at rest.

20. The method of claim 11 wherein the time constant of the method is at most about $(20\,f)^{-1}$, where f is the highest frequency of the relative movement between the two interconnected elements that the system is designed to most effectively control.

21. The method of claim 20 wherein f is at least about 10 Hz.

22. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second, controlled, force therebetween; said method comprising:

(a) measuring the displacement $x_{rel}$ of the second element relative to the first element, $x_{rel}$ being defined as zero at the equilibrium position;

(b) calculating the relative velocity $v_{rel}$ of the two elements;

(c) calculating an applied force $F_{applied}$, defined as $$F_{applied}=0 \qquad \text{if } |v_{rel}|\leq v_{db}; \qquad \text{(condition 1)}$$

$$F_{applied}=-\frac{mv_{rel}^2}{2d}-F_{sys} \qquad \text{if condition 1 is not met;}$$

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means, and (d) applying said force $F_{applied}$ between the first and second elements; provided that
  (i) if the direction of said force $F_{applied}$ is in the same direction as the relative velocity $v_{rel}$, then said force $F_{applied}=0$
  (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;
whereby the force transmitted and the relative displacement between said elements are controlled.

23. The method of claim 22 where $F_{sys}$ is approximated by $F_{sys}=-kx'-Cv_{rel}$, where x' is the relative displacement of the elements in excess of a displacement deadband $x_{db}$ with a value of zero or greater, such that $x'=0$ if $|x_{rel}|\leq x_{db}$ and $x'=x_{rel}-x_{db}\,\text{sgn}(x_{rel})$ if $|x_{rel}|>x_{db}$, k is the spring rate of the spring assembly at the relative displacement $x_{rel}$, and C is an adjustable constant.

24. The method of claim 22 wherein the spring rate k at each relative displacement $x_{rel}$ is taken to be a constant equal to the spring rate at the equilibrium position.

25. The method of claim 22 where $F_{sys}$ is approximated by zero.

26. The method of claim 22 wherein the second element is a seat and an occupant thereof, and wherein mass m is the portion of the total mass of the seat and the occupant which is supported through said linkage when said seat and occupant are at rest.

27. The method of claim 22 wherein the first element is a wheel assembly and the second element comprises a vehicle body, and wherein mass m is taken as that portion of the total mass of the vehicle body which is supported by said wheel assembly when said vehicle body is at rest.

28. The method of claim 22 wherein the time constant of the method is at most about $(20\,f)^{-1}$, where f is the highest frequency of the relative movement between the two interconnected elements that the system is designed to most effectively control.

29. The method of claim 28 wherein f is at least about 10 Hz.

30. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second, controlled, force therebetween; said method comprising:

(a) measuring the displacement $x_{rel}$ of the second element relative to the first element, $x_{rel}$ being defined as zero at the equilibrium position;

(b) calculating the relative velocity $v_{rel}$ of the two elements;

(c) calculating an applied force $F_{applied}$, defined as $$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{if } v_{rel}F_{sys} < 0, \text{ and condition 1 is not met;} \quad \text{(condition 2)}$$

$$F_{applied} = -2\zeta v_{rel}\sqrt{km} - F_{sys} \quad \text{if conditions 1 and 2 are not met;}$$

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, k is the spring rate of the spring assembly at the relative displacement $x_{rel}$ $F_{sys}$ is the sum of the forces acting between the first and second elements other than the controlled force applied by the second force means, $\zeta$ is a number greater than or equal to 0 and less than or equal to 1; and (d) applying said force $F_{applied}$ between the first and second elements; provided that (i) if the direction of said force $F_{applied}$ is in the same direction as the relative velocity $v_{rel}$, then said force $F_{applied}=0$.

(ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;

whereby the force transmitted from the first element to the second element and the relative displacement between said elements are controlled.

31. The method of claim 30 where $F_{sys}$ is approximated by $F_{sys}=-kx'-Cv_{rel}$, where x' is the relative displacement of the elements in excess of a displacement deadband $x_{db}$ with a value of zero or greater, such that x'=0 if $|x_{rel}| \leq x_{db}$ and $x'=x_{rel}-x_{db}$ sgn($x_{rel}$) if $|x_{rel}|>x_{db}$, k is the spring rate of the spring assembly at the relative displacement $x_{rel}$, and C is an adjustable constant.

32. The method of claim 31 wherein the spring rate k at each relative displacement $x_{rel}$ is taken to be a constant equal to the spring rate at the equilibrium position.

33. The method of claim 30 wherein the second element is a seat and an occupant thereof, and wherein mass m is the portion of the total mass of the seat and the occupant which is supported through said linkage when said seat and occupant are at rest.

34. The method of claim 30 wherein the first element is a wheel assembly and the second element comprises a vehicle body, and wherein mass m is taken as that portion of the total mass of the vehicle body which is supported by said wheel assembly when said vehicle body is at rest.

35. The method of claim 30 wherein the time constant of the method is at most about $(20\,f)^{-1}$, where f is the highest frequency of the relative movement between the two interconnected elements that the system is designed to most effectively control.

36. The method of claim 35 wherein f is at least about 10 Hz.

37. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second, controlled, force therebetween; said method comprising:

(a) measuring (i) the displacement $x_{rel}$ of the second element relative to the first element, $x_{rel}$ being defined as zero at the equilibrium position, and (ii) the absolute acceleration of the second element;

(b) calculating (i) the relative velocity $v_{rel}$ of the elements and (ii) the absolute velocity $v_{abs}$ of the second element;

(c) calculating a force $F_{applied}$ defined as:

$$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{if } v_{rel}^2 > -4d\zeta v_{abs}\sqrt{k/m} \quad \text{(condition 2)}$$

$$\text{or } \left[ v_{rel} > 0 \text{ and } v_{abs} < \frac{-F_{sys}}{2\zeta\sqrt{km}} \right], \text{ or}$$

$$\text{or } \left[ v_{rel} < 0 \text{ and } v_{abs} > \frac{-F_{sys}}{2\zeta\sqrt{km}} \right] \Bigg\},$$

and condition 1 is not met

-continued $$F_{applied} = -2\zeta v_{abs} \sqrt{km} - F_{sys} \quad \text{if conditions 1 and 2 are not met;}$$

where:

$v_{db}$ is a velocity deadband with a preselected value greater than or equal to zero, m is the effective mass of the second element.

k is the spring rate of the spring assembly at the relative displacement $x_{rel}$, d is the distance from the relative displacement to the acceptable extreme displacement limit $x_{+limit}$ of $x_{-limit}$ in the direction of the relative velocity $v_{rel}$, $F_{sys}$ is the sum of the forces acting between the first and second elements other than the controlled force applied by the second force means, $\zeta$ is a number greater than 0.5 and less than 3; and (d) applying said force $F_{applied}$ between the first and second elements; provided that (i) if the direction of said force $F_{applied}$ is in the same direction as the relative velocity $v_{rel}$, then said force $F_{applied}=0$, (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;

whereby the force transmitted from the first element to the second element and the relative displacement between said elements are controlled.

38. The method of claim 37 further comprising in step (a) measuring the absolute acceleration of the first element.

39. The method of claim 37 where $F_{sys}$ is approximated by $F_{sys}=-kx'-Cv_{rel}$, where x' is the relative displacement of the elements in excess of a displacement deadband $x_{db}$ with a value of zero or greater, such that $x'=0$ if $|x_{rel}|\leq x_{db}$ and $x'=x_{rel}-x_{db}\, \text{sgn}(x_{rel})$ if $|x_{rel}|>x_{db}$, k is the spring rate of the spring assembly at the relative displacement $x_{rel}$, and C is an adjustable constant.

40. The method of claim 37 wherein the spring rate k at each relative displacement $x_{rel}$ is taken to be a constant equal to the spring rate at the equilibrium position.

41. The method of claim 37 where $F_{sys}$ is approximated by zero.

42. The method of claim 37 wherein the absolute velocity $v_{abs}$ is calculated from the absolute acceleration of the second element using a digital filter with a corner frequency of at most about 0.1 $f_0$, where $f_0$ is the lowest frequency of the relative movement between the two interconnected elements that the system is designed to effectively control.

43. The method of claim 42 where $f_0$ is about 1 Hz.

44. The method of claim 37 wherein the second element is a seat and an occupant thereof, and wherein mass m is the portion of the total mass of the seat and the occupant which is supported through said linkage when said seat and occupant are at rest.

45. The method of claim 37 wherein the first element is a wheel assembly and the second element comprises a vehicle body, and wherein mass m is taken as that portion of the total mass of the vehicle body which is supported by said wheel assembly when said vehicle body is at rest.

46. The method of claim 37 wherein the time constant of the method is at most about $(20\,f)^{-1}$, where f is the highest frequency of the relative movement between the two interconnected elements that the system is designed to most effectively control.

47. The method of claim 46 wherein f is at least about 10 Hz.

48. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second, controlled, force therebetween; said method comprising:

(a) measuring (i) the displacement $x_{rel}$ of the second element relative to the first element, $x_{rel}$ being defined as zero at the equilibrium position, and (ii) the absolute acceleration of the second element;

(b) calculating (i) the relative velocity $v_{rel}$ of the elements, (ii) the relative acceleration $a_{rel}$ of the elements, and (iii) the absolute velocity $v_{abs}$ of the second element;

(c) calculating a force $F_{applied}$ defined as:

$$F_{applied} = 0 \quad \text{if } |v_{rel}| \leq v_{db}; \quad \text{(condition 1)}$$

$$F_{applied} = \frac{ma_{rel}}{1-\sqrt{1+\dfrac{2a_{rel}d}{v_{rel}^2}}} - F_{sys} \quad \text{if } v_{rel} > 0 \quad \text{(condition 2)}$$

$$\text{and } v_{rel}^2 > -2a_{rel}d$$

$$\text{and } \left[ v_{abs} < \frac{-F_{sys}}{2\zeta\sqrt{km}} \text{ or } \right.$$

$$\left. v_{rel}^2 > \frac{8dk\zeta^2 v_{abs}^2}{ma_{rel}+4\zeta v_{abs}\sqrt{km}} \right]$$

and condition 1 is not met;

$$F_{applied} = \frac{ma_{rel}}{1 + \sqrt{1 + \frac{2a_{rel}d}{v_{rel}^2}}} - F_{sys} \quad \text{if } v_{rel} < 0 \qquad \text{(condition 3)}$$

and $v_{rel}^2 > -2a_{rel}d$ and $\left[ v_{abs} > \frac{-F_{sys}}{2\zeta\sqrt{km}} \text{ or} \right.$ $\left. v_{rel}^2 > \frac{8dk\zeta^2 v_{abs}^2}{ma_{rel} + 4\zeta v_{abs}\sqrt{km}} \right]$ and conditions 1 and 2 are not met;

$F_{applied} = -2\zeta v_{abs}\sqrt{km} - F_{sys}$     if conditions 1, 2 and 3 are not met;

where:
- $v_{db}$ is a velocity deadband with a preselected value greater than or equal to zero,
- m is the effective mass of the second element,
- k is the spring rate of the spring assembly at the relative displacement $x_{rel}$,
- d is the distance from the relative displacement to the acceptable extreme displacement limit $x_{+limit}$ or $x_{-limit}$ in the direction of the relative velocity $v_{rel}$,
- $F_{sys}$ is the sum of the forces acting between the first and second elements other than the controlled force applied by the second force means,
- $\zeta$ is a number greater than 0.5 and less than 3.
  (d) applying said force $F_{applied}$ between the first and second elements; provided that
    (i) if the direction of said force $F_{applied}$ is in the same direction as the relative velocity $v_{rel}$, then said force $F_{applied}=0$,
    (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied;
  whereby the force transmitted from the first element to the second element and the relative displacement between said elements are controlled.

49. The method of claim 48 further comprising in step (a) measuring the absolute acceleration of the two elements and calculating the relative acceleration $a_{rel}$ therefrom.

50. The method of claim 48 where $F_{sys}$ is approximated by $F_{sys}=-kx'-Cv_{rel}$, where x' is the relative displacement of the elements in excess of a displacement deadband $x_{db}$ with a value of zero or greater, such that $x'=0$ if $|x_{rel}| \leq x_{db}$ and $x'=x_{rel}-x_{db}\,\text{sgn}(x_{rel})$ if $|x_{rel}|>x_{db}$, k is the spring rate of the spring assembly at the relative displacement $x_{rel}$, and C is an adjustable constant.

51. The method of claim 48 wherein the spring rate k at each relative displacement $x_{rel}$ is taken to be a constant equal to the spring rate at the equilibrium position.

52. The method of claim 48 where $F_{sys}$ is approximated by zero.

53. The method of claim 48 wherein the relative acceleration $a_{rel}$ is calculated by differentiation of the relative velocity using a digital filter.

54. The method of claim 48 wherein the instantaneous relative acceleration $a_{rel}$ used in the calculation of $F_{applied}$ is filtered using a second-order low-pass filter with a corner frequency of between 2 and 20 times $\sqrt{k/m}$, where k is the spring rate of the spring assembly at the equilibrium position.

55. The method of claim 48 wherein the absolute velocity $v_{abs}$ is calculated from the absolute acceleration of the second element using a digital filter with a corner frequency of at most about 0.1 $f_0$, where $f_0$ is the lowest frequency of the relative movement between the two interconnected elements that the system is designed to effectively control.

56. The method of claim 55 where $f_0$ is about 1 Hz.

57. The method of claim 48 wherein the second element is a seat and an occupant thereof, and wherein mass m is the portion of the total mass of the seat and the occupant which is supported through said linkage when said seat and occupant are at rest.

58. The method of claim 48 wherein the first element is a wheel assembly and the second element comprises a vehicle body, and wherein mass m is taken as that portion of the total mass of the vehicle body which is supported by said wheel assembly when said vehicle body is at rest.

59. The method of claim 48 wherein the time constant of the method is at most about $(20\,f)^{-1}$, where f is the highest frequency of the relative movement between the two interconnected elements that the system is designed to most effectively control.

60. The method of claim 59 wherein f is at least about 10 Hz.

61. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being provided with a means for applying a second, controlled, force therebetween; said device comprising:
  (A) an adjustable damper capable of applying a variable force $F_{applied}$ between said first and second elements; and
  (B) a controller adapted to send a control signal to said damper in response to the condition of the two movably interconnected elements, said control signal corresponding to a value of $F_{applied}$;
  wherein said control signal is determined by:
  (a) measuring the displacement $x_{rel}$ of the second element relative to the first element, $x_{rel}$ being defined as zero at the equilibrium position;

(b) determining the relative velocity $v_{rel}$ between said first and second elements;

(c) calculating a force $F_{applied}$ defined as:

$$F_{applied} = F_{calc} - F_{sys}$$

where $F_{calc}$ is a force, calculated from knowledge of the position and motion of the elements, sufficient to prevent the relative motion of the elements from exceeding predetermined limits, and $F_{sys}$ is a nonzero sum of the forces acting between the first and second elements other than the controlled force applied by the second force means, provided that $F_{applied} = 0$ if said force $F_{applied}$ is in the same direction as the relative velocity $v_{rel}$ of the elements, or if $|v_{rel}| \leq v_{db}$, where $v_{db}$ is a velocity deadband with a preselected value greater than or equal to zero, and $F_{applied} = F_{max}$ if said force $F_{applied}$ is in direction opposite the relative velocity $v_{rel}$ of the elements, and greater than the maximum force $F_{max}$ that can be applied by the second force means in the direction of $F_{applied}$.

62. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) an adjustable damper capable of applying a variable force $F_{applied}$ between said first and second elements; and (B) a controller adapted to send a control signal to said damper in response to the condition of the two movably interconnected elements, said control signal corresponding to a value of $F_{applied}$;

wherein said control signal is determined by:

(a) measuring the displacement $x_{rel}$ of the second element relative to the first element, $x_{rel}$ being defined as zero at the equilibrium position;

(b) calculating the (i) relative velocity $v_{rel}$ and (ii) relative acceleration $a_{rel}$ of the elements; and (c) calculating an applied force $F_{applied}$, defined as $$F_{applied} = \frac{ma_{rel}}{1 - \sqrt{1 + \frac{2a_{rel}d}{v_{rel}^2}}} - F_{sys} \quad \text{if } v_{rel} > 0 \quad \text{(condition 1)}$$

and $v_{rel}^2 > -2a_{rel}d$, $$F_{applied} = \frac{ma_{rel}}{1 + \sqrt{1 + \frac{2a_{rel}d}{v_{rel}^2}}} - F_{sys} \quad \text{if } v_{rel} < 0 \quad \text{(condition 2)}$$

and $v_{rel}^2 > -2a_{rel}d$, $$F_{applied} = 0 \quad \text{if } |v_{rel}| \leq v_{db},$$

or conditions 1 and 2 are not met;

where:

$v_{db}$ is a velocity deadband with a preselected value greater than or equal to zero, m is the effective mass of the second element, d is the distance from the relative displacement to the acceptable extreme displacement limit $x_{+limit}$ of $x_{-limit}$ in the direction of the relative velocity $v_{rel}$, $F_{sys}$ is the sum of the forces acting between the first and second elements other than the controlled force applied by the second force means;

provided that (i) if the direction of said force $F_{applied}$ is in the same direction as the relative velocity $v_{rel}$, then said force $F_{applied} = 0$, (ii) if said force $F_{applied}$ is in direction opposite the relative velocity $v_{rel}$, and greater than the maximum force $F_{max}$ that can be applied by the second force means in the direction $F_{applied}$, then $F_{max}$ is applied.

63. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) an adjustable damper capable of applying a variable force $F_{applied}$ between said first and second elements; and (B) a controller adapted to send a control signal to said damper in response to the condition of the two movably interconnected elements, said control signal corresponding to a value of $F_{applied}$;

wherein said control signal is determined by:

(a) measuring the displacement $x_{rel}$ of the second element relative to the first element, $x_{rel}$ being defined as zero at the equilibrium position;

(b) calculating the relative velocity $v_{rel}$ of the two elements;

(c) calculating an applied force $F_{applied}$, defined as $$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{if condition 1 is not met;}$$

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means;

provided that
  (i) if the direction of said force $F_{applied}$ is in the same direction as the relative velocity $v_{rel}$, then said force $F_{applied}=0$
  (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied.

64. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) an adjustable damper capable of applying a variable force $F_{applied}$ between said first and second elements; and (B) a controller adapted to send a control signal to said damper in response to the condition of the two movably interconnected elements, said control signal corresponding to a value of $F_{applied}$;

wherein said control signal is determined by:

(a) measuring the displacement $x_{rel}$ of the second element relative to the first element, $x_{rel}$ being defined as zero at the equilibrium position;

(b) calculating the relative velocity $v_{rel}$ of the two elements; and (c) calculating an applied force $F_{applied}$, defined as $$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{if } v_{rel}F_{sys} < 0, \text{ and condition 1 is not met}; \quad \text{(condition 2)}$$

$$F_{applied} = -2\zeta v_{rel}\sqrt{km} - F_{sys} \quad \text{if conditions 1 and 2 are not met};$$

where:

$v_{db}$ is a velocity deadband with a preselected value greater than or equal to zero, m is the effective mass of the second element, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means, $\zeta$ is a number greater than or equal to 0 and less than or equal to 1; and provided that
  (i) if the direction of said force $F_{applied}$ is in the same direction as the relative velocity $v_{rel}$, then said force $F_{applied}=0$,
  (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied.

65. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) an adjustable damper capable of applying a variable force $F_{applied}$ between said first and second elements; and (B) a controller adapted to send a control signal to said damper in response to the condition of the two movably interconnected elements, said control signal corresponding to a value of $F_{applied}$;

wherein said control signal is determined by:

(a) measuring (i) the displacement $x_{rel}$ of the second element relative to the first element, $x_{rel}$ being defined as zero at the equilibrium position, and (ii) the absolute acceleration of the second element;

(b) calculating (i) the relative velocity $v_{rel}$ of the elements and (ii) the absolute velocity $v_{abs}$ of the second element; and (c) calculating a force $F_{applied}$ defined as:

$$F_{applied} = 0 \quad \text{if } |v_{rel}| \leq v_{db}; \quad \text{(condition 1)}$$

$$F_{applied} = -\frac{mv_{rel}^2}{2d} - F_{sys} \quad \text{(condition 2)}$$

$$\text{if } v_{rel}^2 > -4d\zeta v_{abs}\sqrt{k/m}$$

$$\text{or } \left[ v_{rel} > 0 \text{ and } v_{abs} < \frac{-F_{sys}}{2\zeta\sqrt{km}} \right], \text{ or}$$

$$\text{or } \left[ v_{rel} < 0 \text{ and } v_{abs} > \frac{-F_{sys}}{2\zeta\sqrt{km}} \right] \Big\},$$

and condition 1 is not met $$F_{applied} = -2\zeta v_{abs}\sqrt{km} - F_{sys} \quad \text{if conditions 1 and 2 are not met};$$

where:

$v_{db}$ is a velocity deadband with a preselected value greater than or equal to zero, m is the effective mass of the second element, k is the spring rate of the spring assembly at the relative displacement $x_{rel}$, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means, $\zeta$ is a number greater than 0.5 and less than 3;
provided that
(i) if the direction of said force $F_{applied}$ is in the same direction as the relative velocity $v_{rel}$, then said force $F_{applied}=0$,
(ii) if said force $F_{applied}$ is in direction opposite the relative velocity $v_{rel}$, and greater than the maximum force $F_{max}$ that can be applied by the second force means, then $F_{max}$ is applied.

$$F_{applied} = 0$$

$$F_{applied} = \frac{ma_{rel}}{1 - \sqrt{1 + \frac{2a_{rel}d}{v_{rel}^2}}} - F_{sys}$$

$$F_{applied} = \frac{ma_{rel}}{1 + \sqrt{1 + \frac{2a_{rel}d}{v_{rel}^2}}} - F_{sys}$$

$$F_{applied} = -2\zeta v_{abs}\sqrt{km} - F_{sys}$$

66. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) an adjustable damper capable of applying a variable force $F_{applied}$ between said first and second elements; and (B) a controller adapted to send a control signal to said damper in response to the condition of the two movably interconnected elements, said control signal corresponding to a value of $F_{applied}$;

wherein said control signal is determined by:

(a) measuring (i) the displacement $x_{rel}$ of the second element relative to the first element, $x_{rel}$ being defined as zero at the equilibrium position, and (ii) the absolute acceleration of the second element;

(b) calculating (i) the relative velocity $v_{rel}$ of the elements, (ii) the relative acceleration $a_{rel}$ of the elements, and (iii) the absolute velocity $v_{abs}$ of the second element; and (c) calculating a force $F_{applied}$ defined as:

if $|v_{rel}| \leq v_{db}$; (condition 1)

if $v_{rel} > 0$ (condition 2)

and $v_{rel}^2 > -2a_{rel}d$ and $\left[ v_{abs} < \frac{-F_{sys}}{2\zeta\sqrt{km}} \right.$ or $\left. v_{rel}^2 > \frac{8dk\zeta^2 v_{abs}^2}{ma_{rel} + 4\zeta v_{abs}\sqrt{km}} \right]$ and condition 1 is not met;

if $v_{rel} < 0$ (condition 3)

and $v_{rel}^2 > -2a_{rel}d$ and $\left[ v_{abs} > \frac{-F_{sys}}{2\zeta\sqrt{km}} \right.$ or $\left. v_{rel}^2 > \frac{8dk\zeta^2 v_{abs}^2}{ma_{rel} + 4\zeta v_{abs}\sqrt{km}} \right]$ and conditions 1 and 2 are not met;

if conditions 1, 2 and 3 are not met;

where:

$v_{db}$ is a velocity deadband with a preselected value greater than or equal to zero, m is the effective mass of the second element, k is the spring rate of the spring assembly at the relative displacement $x_{rel}$, d is the distance from the relative displacement to the acceptable extreme displacement limit $x_{+limit}$ or $x_{-limit}$ in the direction of the relative velocity $v_{rel}$, $F_{sys}$ is the sum of the forces acting between the first and second elements other than the controlled force applied by the second force means, $\zeta$ is a number greater than 0.5 and less than 3; provided that (i) if the direction of said force $F_{applied}$ is in the same direction as the relative velocity $v_{rel}$, then said force $F_{applied}=0$, (ii) if said force $F_{applied}$ is in direction opposite the relative velocity $v_{rel}$, and greater than the maximum force $F_{max}$ that can be applied by the second force means in the direction of $F_{applied}$, then $F_{max}$ is applied.

* * * * *